(12) United States Patent
Minami et al.

(10) Patent No.: US 6,968,499 B1
(45) Date of Patent: Nov. 22, 2005

(54) METHOD AND APPARATUS FOR DECIDING DISPLAY INFORMATION

(75) Inventors: Kazuhiro Minami, West Lebanon, NH (US); Koji Zettsu, Fujisawa (JP); Hajime Tsuchitani, Kamakurashi (JP); Satoshi Higuchi, Yokohama (JP); Masakazu Tsuchiya, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 09/617,906

(22) Filed: Jul. 17, 2000

(30) Foreign Application Priority Data

Jul. 30, 1999 (JP) ................................. 11-217981

(51) Int. Cl.[7] ............................................. G06F 15/00
(52) U.S. Cl. ....................... 715/500; 715/517; 715/526
(58) Field of Search ................................ 715/522, 531, 715/500, 517, 526; 709/224; 707/10; 345/764

(56) References Cited

U.S. PATENT DOCUMENTS

| | | | | |
|---|---|---|---|---|
| 5,621,875 A | * | 4/1997 | Mason et al. ................ | 715/531 |
| 5,644,776 A | * | 7/1997 | DeRose et al. ............. | 715/500 |
| 5,796,952 A | * | 8/1998 | Davis et al. ................ | 709/224 |
| 5,860,073 A | * | 1/1999 | Ferrel et al. ................ | 715/522 |
| 5,870,737 A | | 2/1999 | Ruggles et al. .............. | 707/4 |
| 6,094,655 A | * | 7/2000 | Rogers et al. ................ | 707/10 |
| 6,621,505 B1 | * | 9/2003 | Beauchamp et al. ........ | 345/764 |

FOREIGN PATENT DOCUMENTS

| | | | | |
|---|---|---|---|---|
| JP | 1019859 | 1/1989 | ........... | G06F 12/00 |
| JP | 1031242 | 2/1989 | ........... | G06F 17/60 |
| JP | 1033408 | 2/1989 | ........... | G06F 17/21 |
| JP | 1106615 | 4/1989 | ........... | G06F 17/60 |
| JP | 1108572 | 4/1989 | ........... | G06F 17/00 |
| JP | 091215 | 4/1997 | ........... | G06F 17/30 |
| JP | 334086 | 12/1998 | ........... | G06F 17/21 |
| JP | 143910 | 5/1999 | ........... | G06F 17/30 |

* cited by examiner

OTHER PUBLICATIONS

"Persona: a Framework to Provide Adaptive Presenation for Web Documents", by Junichi Suzuki, et al. Dept. of Computer Science, Graduate School of Science & Technology, Keio University, Yokohama City, Japan p. 101-108, Sep., 1998.

*Primary Examiner*—Stephen Hong
*Assistant Examiner*—Jonathan Schlaifer
(74) *Attorney, Agent, or Firm*—Duke W. Yee; A. Bruce Clay; Wayne P. Bailey

(57) ABSTRACT

Contents to be embedded in a page template or layouts can be dynamically changed without editing an HTML file or correcting a server program such as CGI. A page template is defined with a servlet that specifies a display area and a display attribute for controlling displays as parameters. When the Servlet is recognized at the web server side, a plurality of part beans that are stored by being related to display-area specifying information are specified. The information for linking image data for forming an object to be embedded in the display area and link-destination-URL information are set to the part beans as properties. Moreover, display-condition information such as schedule information or the like is related to the part beans. A display condition is checked by each of the part beans stored by being related to the display-area specifying information to obtain the image data for forming an object to be embedded in a display area, link-destination-URL information or the like in accordance with the link information serving as properties of the part beans meeting the display condition and generating the HTML.

5 Claims, 29 Drawing Sheets

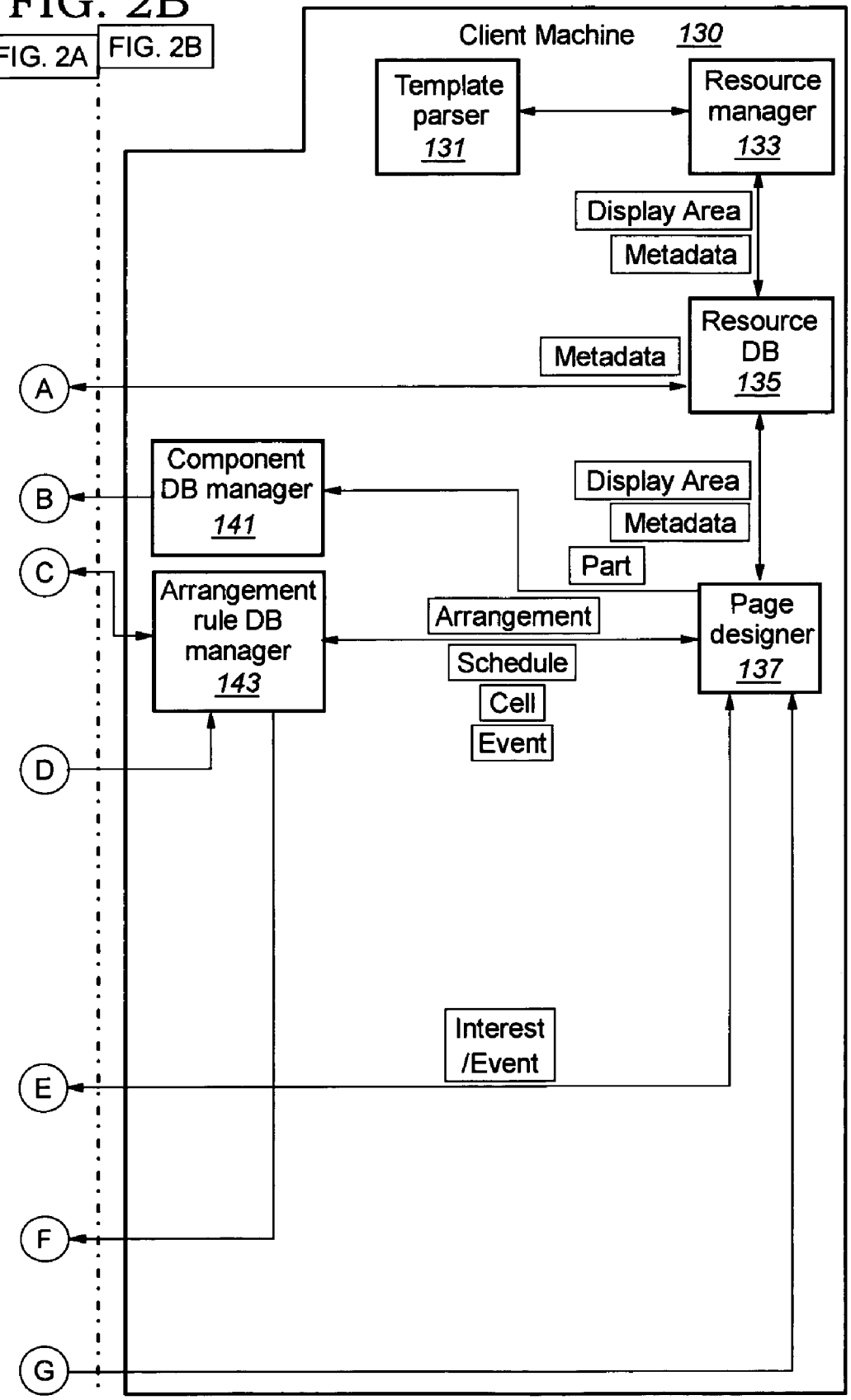

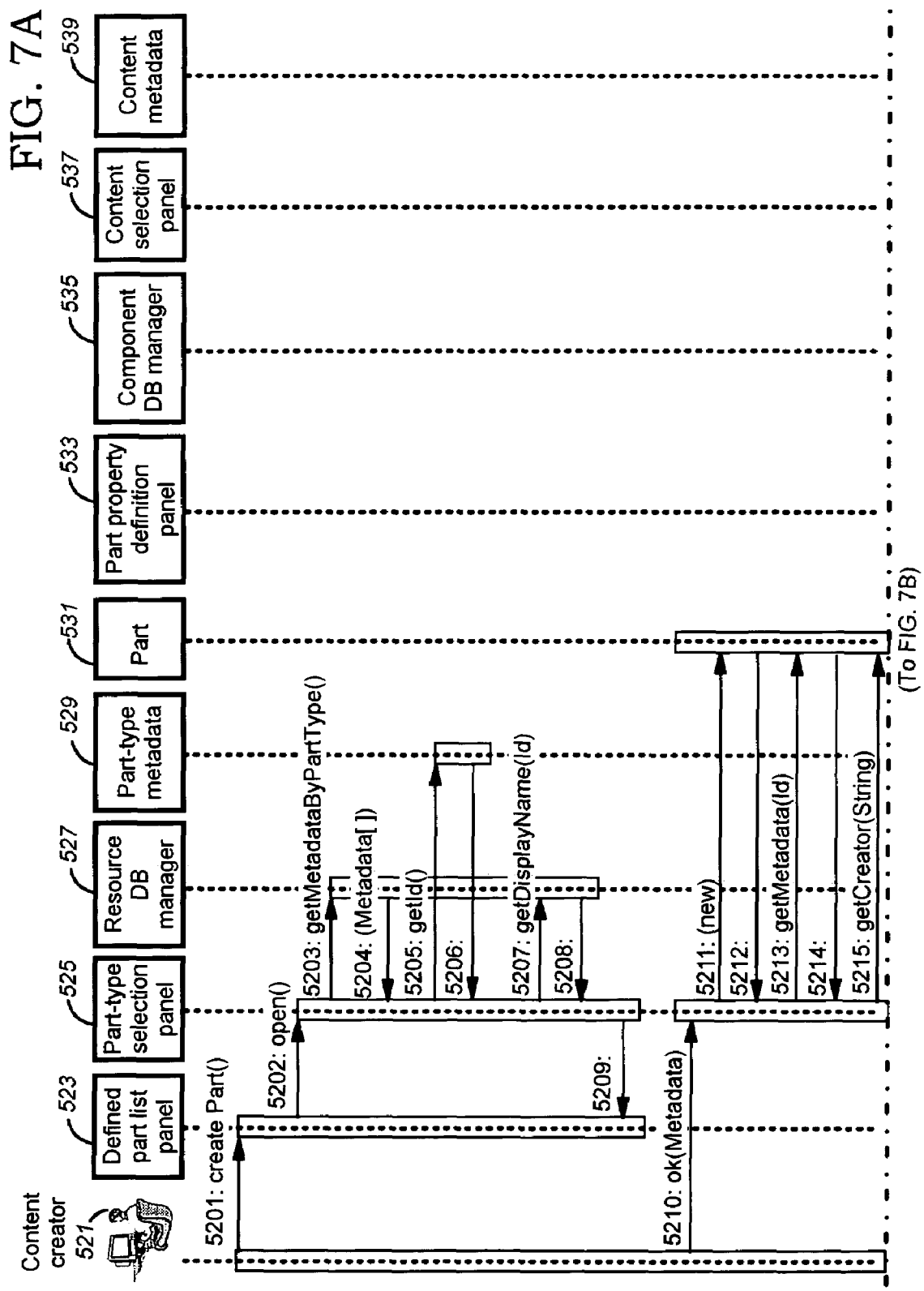

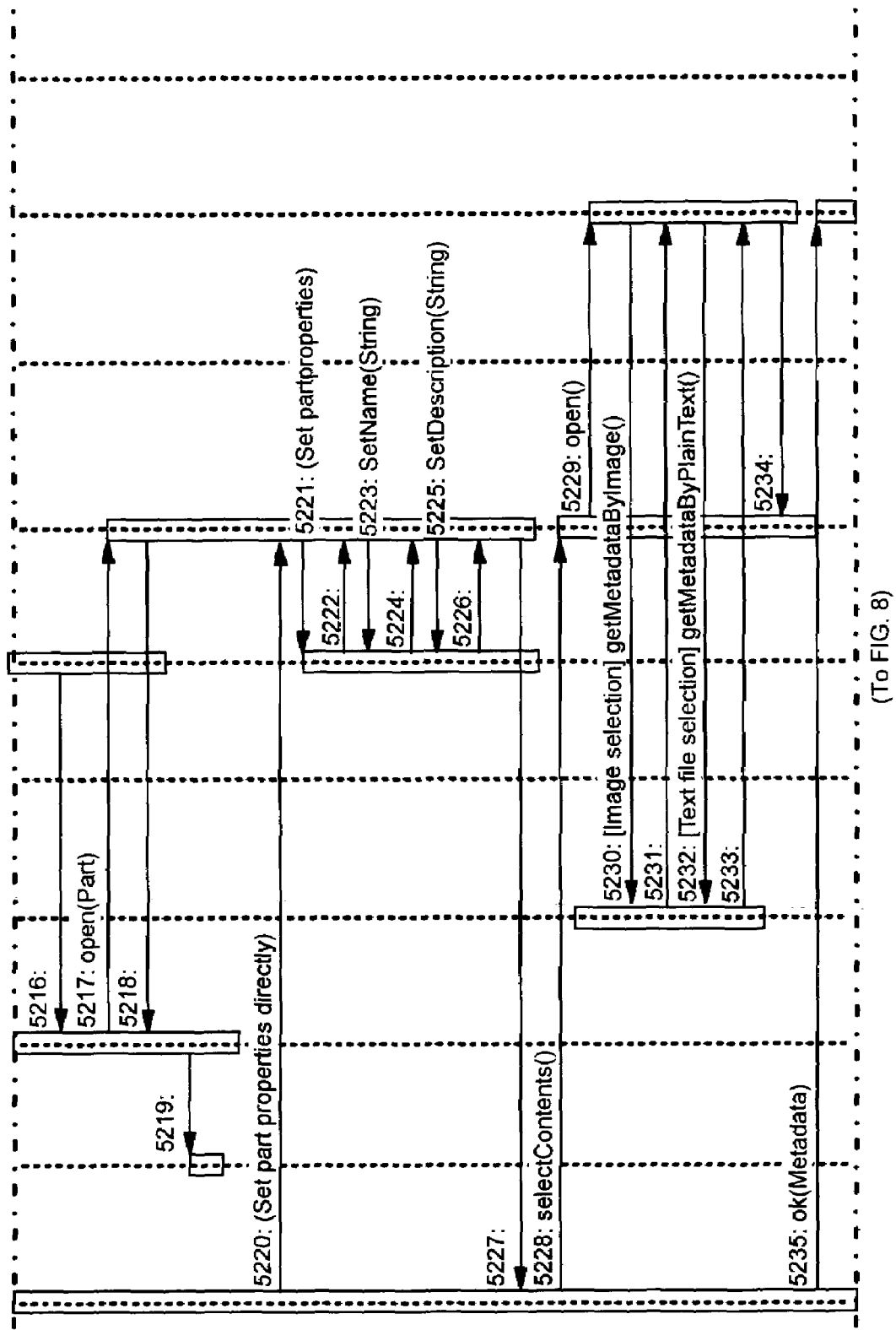

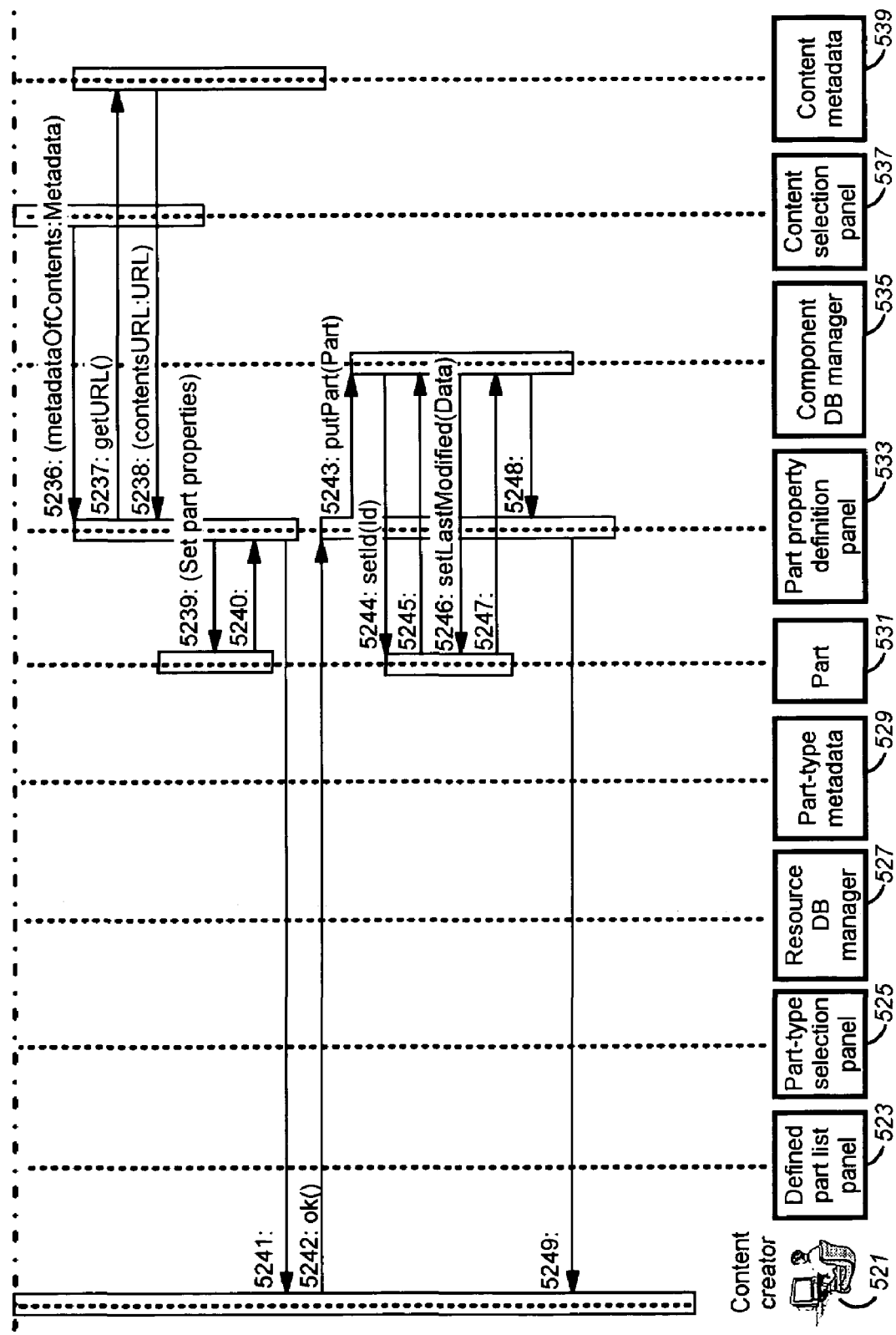

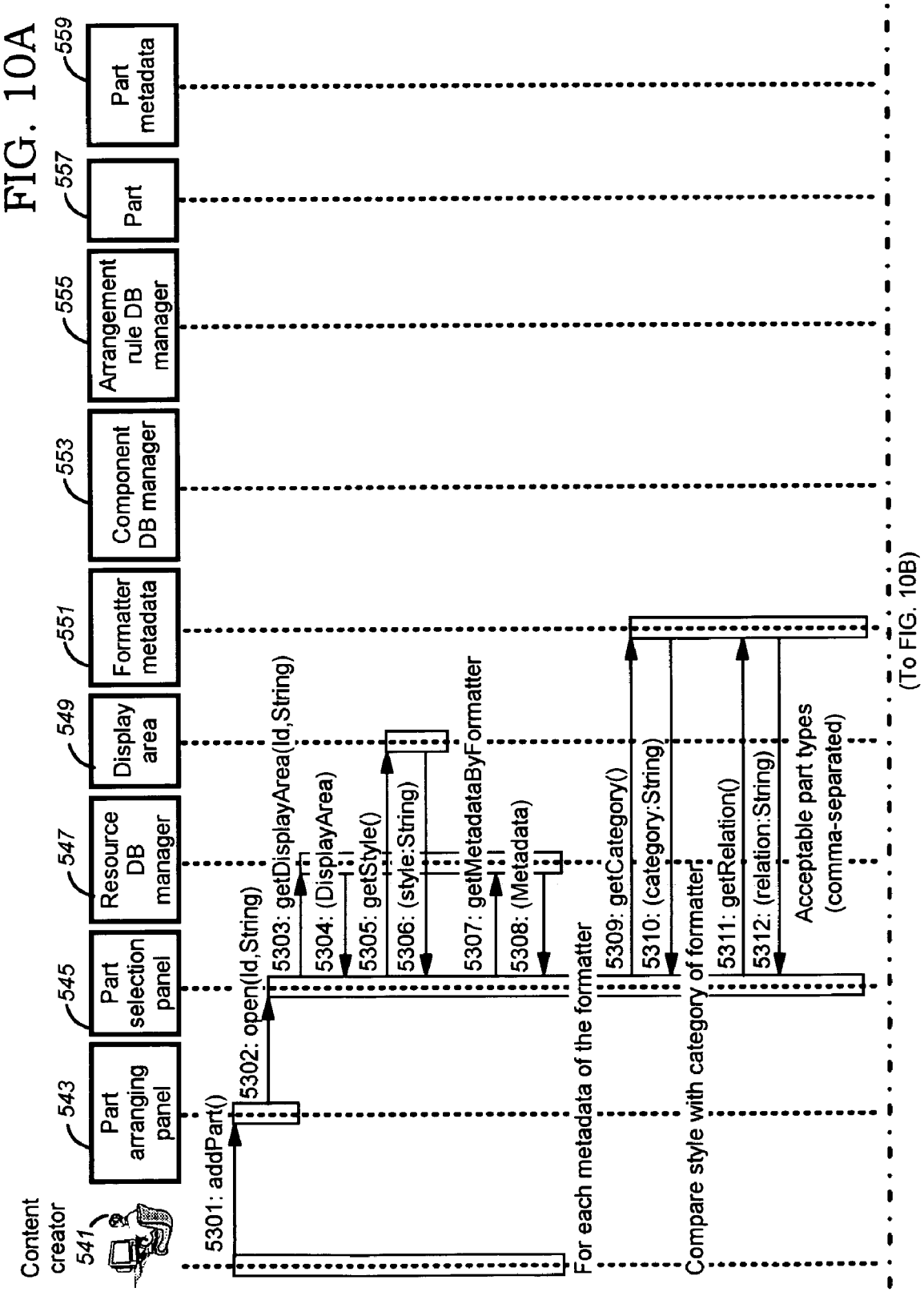

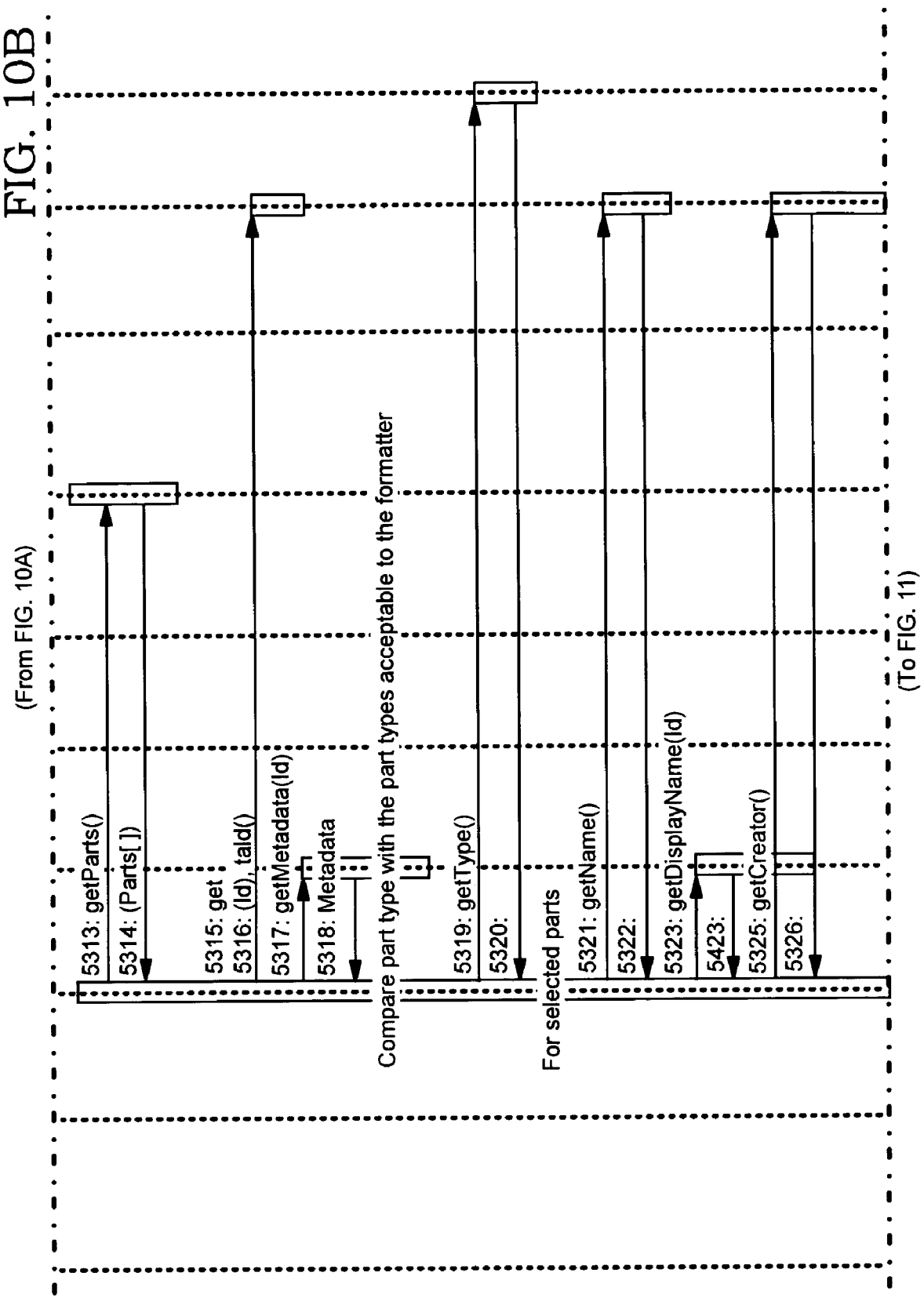

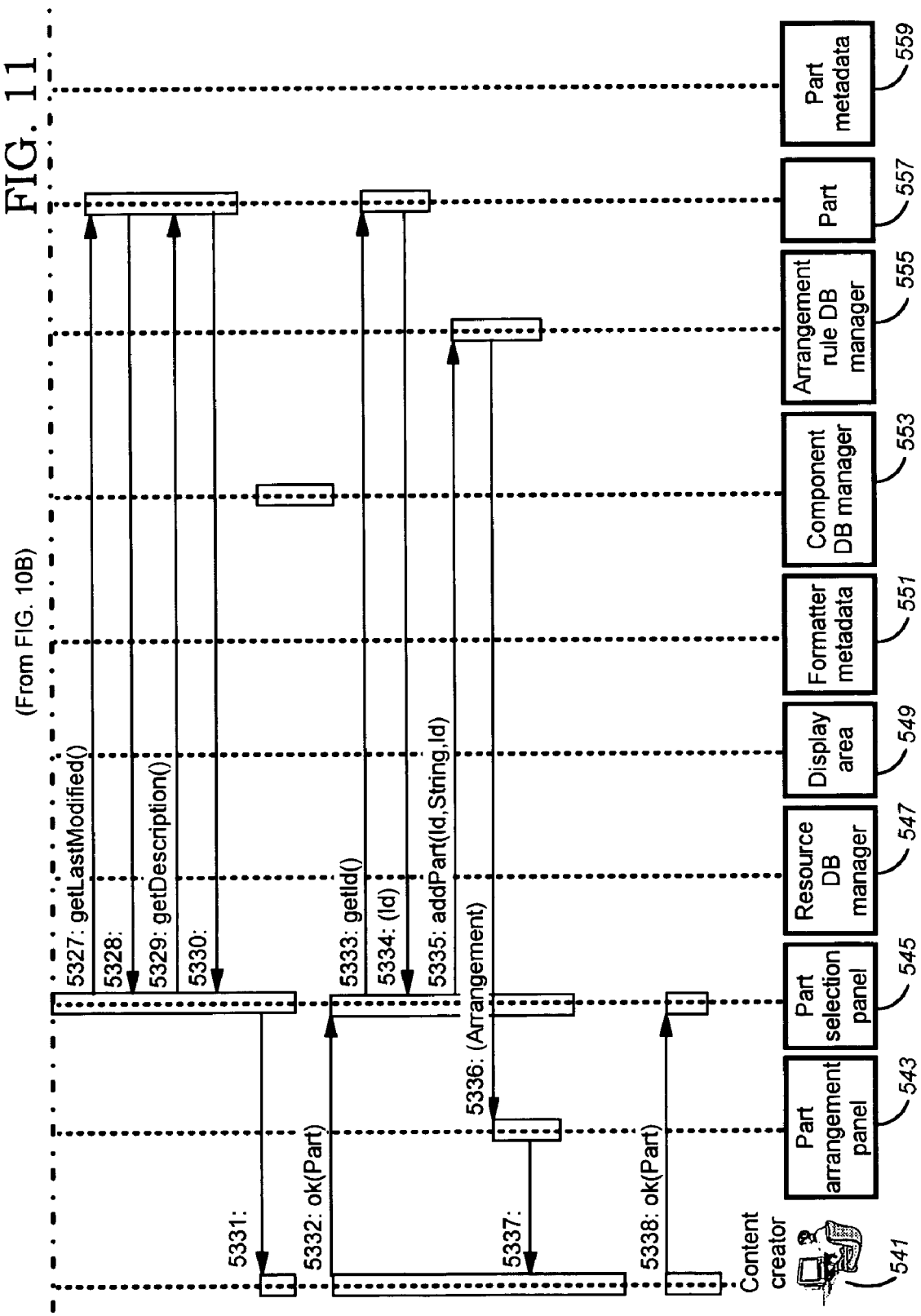

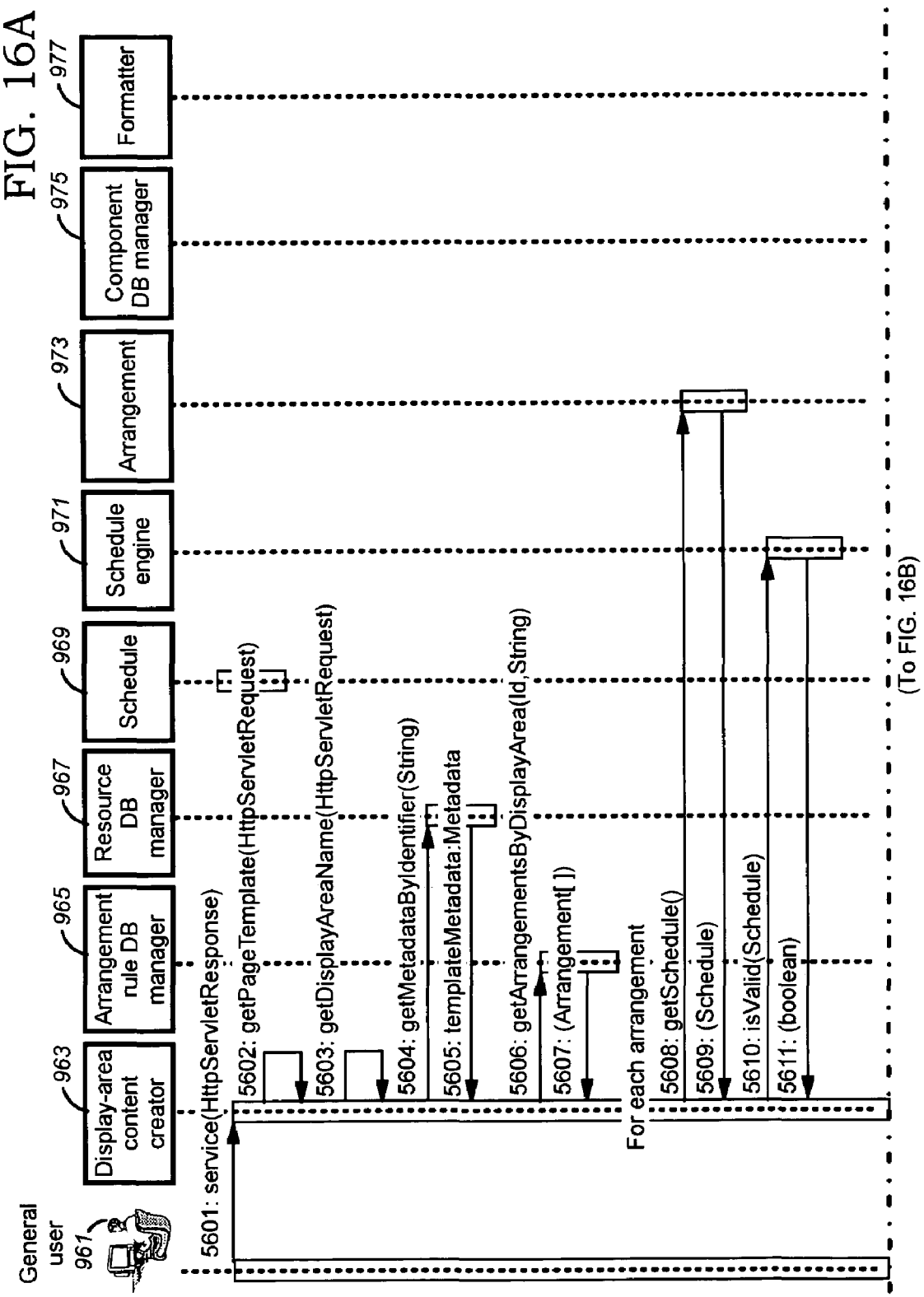

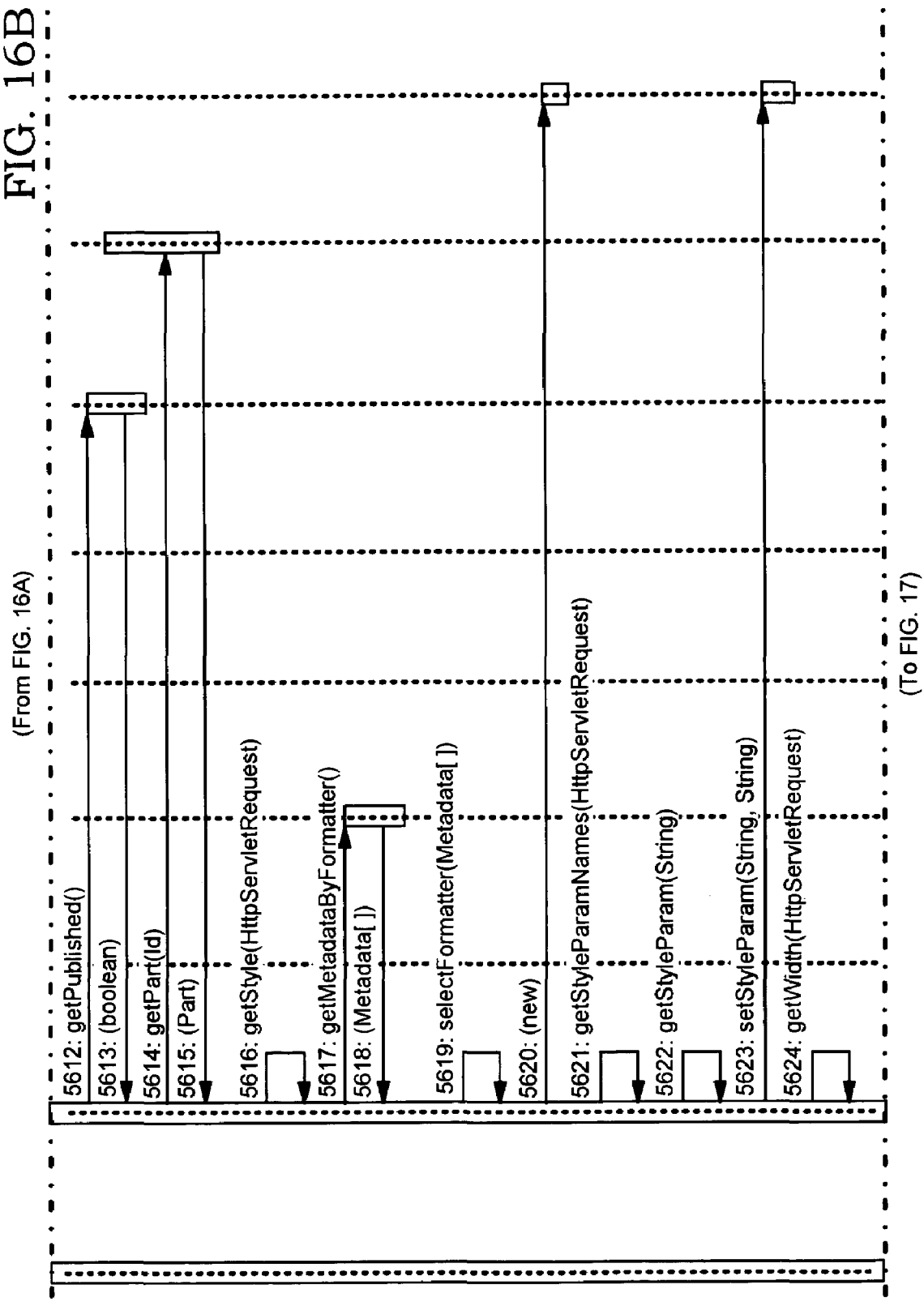

FIG. 18

```
<SERVLET code=icdacrt codebase=servlet>                           701
    <PARAM NAME="name" VALUE="product_ad">
    <PARAM NAME="style" VALUE="bannerFlow">
    <PARAM NAME="direction" VALUE="horizontal">
    <PARAM NAME="bgColor" VALUE="Gray">
    <PARAM NAME="width" VALUE="300">
    <PARAM NAME="height" VALUE="80">                              703
    <PARAM NAME="position" VALUE="top">
    <PARAM NAME="default" VALUE="<IMG SRC='default_img.gif'>">
    <PARAM NAME="partsOverfull" VALUE="random">
    <PARAM NAME="partsUnderfull" VALUE="shrink">
</SERVLET>
```

Example of display area in practical use  700

FIG. 19

| Part ID | Part display area name | Part template ID | START | END | Publish |
|---------|------------------------|------------------|-------|-----|---------|
| 0001 | product_ad | 1001 | 1999-01-01 0:00 | 1999-07-01 0:00 | 1 |
| 0002 | product_ad | 1002 | 1999-07-01 0:00 | 2000-01-01 0:00 | 1 |
| 0003 | product_inf | 1003 | 1999-08-01 4:00 | 1999-09-20 23:00 | 0 |
| . | . | . | . | . | . |
| . | . | . | . | . | . |
| . | . | . | . | . | . |

Arrangement rule DC  710

FIG. 24

| Part type | Part ID | Part display area name | Page template ID | START | END | Publish | Event flag | Cell part ID |
|---|---|---|---|---|---|---|---|---|
| Banner | 0001 | product_ad | 1001 | 1999-01-01 0:00 | 1999-07-01 0:00 | 1 | 1 | 2001 |
| Banner | 0002 | product_ad | 1002 | 1999-07-01 0:00 | 2000-01-01 0:00 | 1 | 1 | 2001 |
| Telop | 0003 | product_inf | 1003 | 1999-08-01 4:00 | 1999-09-20 23:00 | 0 | 0 | 2001 |
| Event | 0004 | | | | | | 1 | 2003 |
| . | . | . | . | . | . | . | . | . |
| . | . | . | . | . | . | . | . | . |
| . | . | . | . | . | . | . | . | . |

1720
Arrangement rule DB

FIG. 26

| User ID | Cookie | E-mail address | User profile |
|---|---|---|---|
| | | | |

1740
User control DB

FIG. 27

| Subscription ID | User ID | Part ID | Conditional expression | Notification type | Campaign flag |
|---|---|---|---|---|---|
| 751 | 753 | 755 | 757 | 758 | 759 |
| | | | | | |

750
Subscription DB

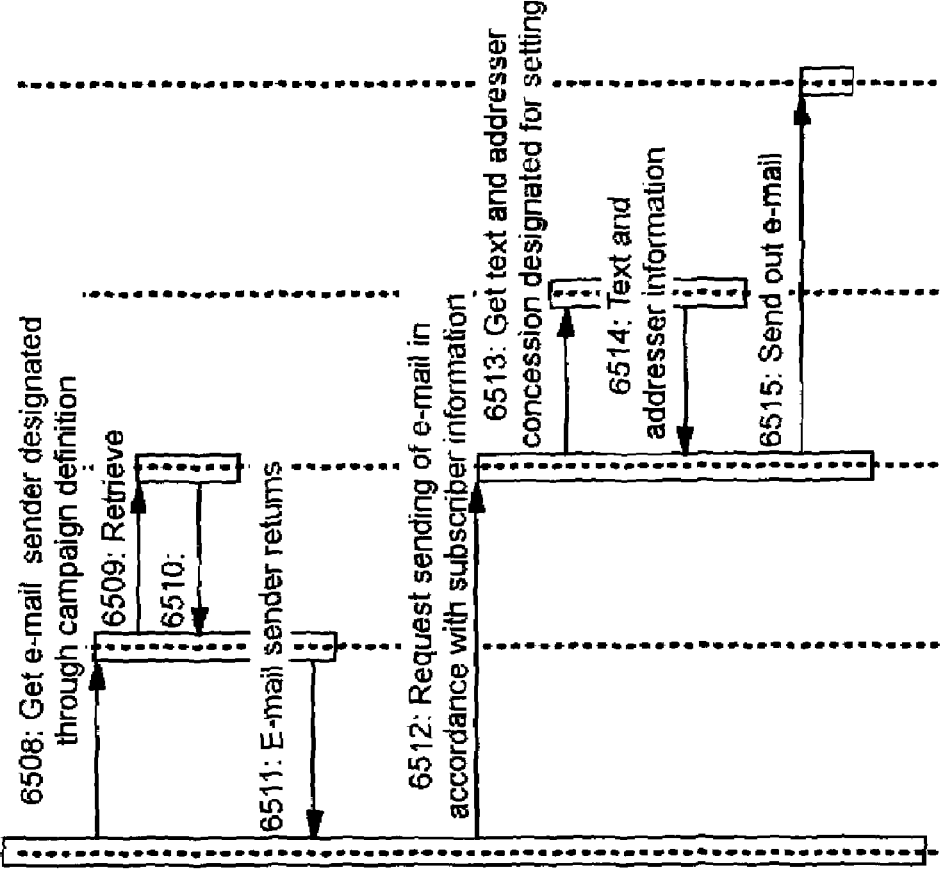

METHOD AND APPARATUS FOR DECIDING DISPLAY INFORMATION

TECHNICAL FIELD OF THE INVENTION

The present invention relates to a system for dynamically changing the information to be displayed on a web browser, particularly to a system for dynamically changing the data to be embedded in a page template.

BACKGROUND OF THE INVENTION

The prior art uses displayed web page information that is infrequently changed as an HTML template. Frequently changed web page information is embedded in the template and displayed as disclosed in Published Unexamined Patent Application Nos. 10-198596, 11-85727, 10-334086, and 11-66152 specification.

However, this prior art uses a system of selecting data to be embedded in the template and designating an access method, a layout, a data format or the like by a CGI program as shown in FIG. 29. Alternatively, a system for embedding a program to access predetermined data and for displaying the data in accordance with a predetermined format, and incorporating the program into a template, such as a Java bean, for accessing data as shown in FIG. 30.

A data base name, file name or the like is fixedly described in the CGI program or Java bean. Therefore, to incorporate the information for another data base or the contents of another file or the like into a template without changing the contents themselves of a data base or file, requires correction to the CGI program or replacement of the old Java bean with a new Java bean, and thus, it is impossible to dynamically change predetermined display data. Moreover, knowledge of programming techniques may be required for web page designers.

In order to conduct an advertisement campaign for various products on the Internet with a web browser, it is helpful if a planner of the campaign can change contents or layouts in accordance with the object or schedule of an intended customer without editing an HTML file or correcting a server program, such as a CGI or the like.

Moreover, by only displaying a predetermined content for a predetermined user, it is possible to transfer effective information, such as effective advertisement based on the needs of the user, to the user and increase sales when enhancing the advertisement effect or performing electronic commerce.

SUMMARY OF THE INVENTION

It is an object of the present invention to provide a system making it possible to change contents or layouts to be embedded in a page template without editing an HTML file or correcting a server program such as a CGI.

It is another object of the present invention to provide a system making it possible to dynamically change contents or layouts to be embedded in a page template in accordance with the situation when access is made by a user.

It is still another object of the present invention to provide a high-versatility and low-cost system making it possible to apply the information for contents or layouts to be embedded in a page template also to other page templates.

It is still another object of the present invention to provide a system making it possible to supply the information suitable for the taste or behavior pattern of a user only to the user or a group including the user in accordance with the behavior of the user using Internet.

It is still another object of the present invention to provide a system using fewer resources necessary for execution.

To solve the above problems, the present invention defines a Servlet having information for specifying a display area in the display-area defining section of a page template, specified by a display-information obtaining request sent from an information terminal and display attribute information (information used to control display) as parameters. When the Servlet is recognized at the web server side, a plurality of part Java beans, stored by being related to display-area specifying information, are specified. Image data for forming an object to be embedded in the display area of the part Java bean and information for linking link-destination URL information and output message information are set in the part Java bean as properties. Moreover, display-condition information, such as schedule information for determining whether the part Java bean is actually used, is related to the part Java bean. The display condition is checked by each of the stored part Java beans to narrow down objects to be displayed. Moreover, the image data for forming an object to be embedded in the display area, link-destination URL information, and output message information are obtained in accordance with the link information serving as the property of the part Java bean meeting the display condition to generate the HTML and transmit it to the information terminal side.

Another mode of the present invention provides a display-information deciding method to be executed by a display-information deciding apparatus for transmitting display information to an information terminal provided with a display screen and an input unit, comprising the steps of:

(a) analyzing a page template specified by a display-information obtaining request sent from the information terminal;

(b) obtaining display-area specifying information and display attribute information from the page template;

(c) obtaining a plurality of pieces of content specifying information related to display-area specifying information;

(d) inspecting a plurality of display conditions respectively related to each of the pieces of content specifying information to judge whether each display condition has a content to be embedded in the page template;

(e) shaping at least one content judged to be a content to be embedded in the page template in accordance with the display-attribute information; and (f) transmitting the shaped content to the information terminal.

In claims of this specification, "display area" is a concept including an area for displaying a dynamically determined content. Moreover, "display attribute information" is a concept including a parameter and the like used to control displays. Furthermore, "display condition" is a concept including various conditions such as not only "schedule condition", "publication determination flag" to be described later for embodiments or the like, but also a condition on whether to be an access from a predetermined user or not, a condition depending on the state of a predetermined resource (for example, condition interlocking with whether the value of a fluctuating predetermined data base exceeds a predetermined value, condition interlocking with whether the operating rate of a predetermined server is equal to or more than a predetermined value, condition on whether an out-of-service customer support agent is present or the like).

Another mode of the present invention provides a display-information deciding method to be executed by a display-information deciding apparatus for transmitting display information to an information terminal provided with a display screen and an input unit, comprising the steps of:
- (a) analyzing a page template specified by a display-information obtaining request sent from the information terminal;
- (b) obtaining display-area specifying information from the page template;
- (c) obtaining a plurality of banner beans related to display-area specifying information in the display-information deciding apparatus;
- (d) inspecting a plurality of schedule conditions respectively related to each of the banner beans to judge whether each schedule condition is a bean including a banner to be embedded in the page template;
- (e) obtaining display-image specifying information and link-destination-URL specifying information from a banner bean judged as a bean including a banner to be embedded in the page template; and
- (f) transmitting display image data corresponding to the display-image specifying information and character string information corresponding to the link-destination-URL specifying information to the information terminal.

In claims of this specification, "bean" is an object capable of providing property information to be controlled correspondingly to an inquiry performed through a predetermined interface and a concept including a Java bean.

Still another mode of the present invention provides a display information deciding method to be executed by a display-information deciding apparatus for transmitting display information to an information terminal provided with a display screen and an input unit, comprising the steps of:
- (a) analyzing a page template specified by a display-information obtaining request sent from the information terminal;
- (b) obtaining display-area specifying information from the page template;
- (c) obtaining a plurality of pieces of content specifying information related to display-area specifying information;
- (d) inspecting a plurality of display conditions respectively related to each of the pieces of content specifying information to judge whether each display condition has a content to be embedded in the page template; and
- (e) transmitting at least one content judged as a content to be embedded in the page template to the information terminal.

Still another mode of the present invention provides a display information deciding method to be executed by a display-information deciding apparatus for transmitting display information to an information terminal provided with a display screen and an input unit, comprising the steps of:
- (a) defining a page-template bean for holding as a property the information for specifying an HTML file including a Servlet defining section containing display-area specifying information as a parameter;
- (b) obtaining content specifying information from a part bean judged as a part bean for holding the content specifying information for specifying the content of a part displayed in the display area as a property;
- (c) setting schedule information serving as a condition for the contents to be displayed in the display area to the part bean; and
- (d) holding the part bean and the display-area specifying information by relating them with each is other.

Still another mode of the present invention provides a display-information deciding system including a display-information deciding apparatus for transmitting display information to an information terminal provided with a display screen and an input unit, comprising:
- (a) a display-area content creator for analyzing a page template specified by a display-information obtaining request sent from the information terminal, obtaining display-area specifying information from the page template, and obtaining a plurality of pieces of content specifying information related to display-area specifying information;
- (b) a schedule engine for inspecting a plurality of display conditions respectively related to each of the pieces of content specifying information to judge whether each display condition has a content to be embedded in the page template; and
- (c) web server software for transmitting at least one content judged as a content to be embedded in the page template to the information terminal.

Still another mode of the present invention provides a display-information deciding system including a data base to be accessed by a display-information deciding apparatus for transmitting the corresponding display information in response to a request for obtaining an HTML file including a Servlet defining section containing display-area specifying information and display attribute information as parameters from an information terminal provided with a display screen and an input unit, comprising:
- (a) a component DB for storing a part bean holding content specifying information for specifying the content of a part displayed in the display area as a property; and
- (b) an arrangement rule DB for storing an arrangement object for holding the part bean, the display-area specifying information, and schedule information serving as a condition for the part to be displayed in the display area by relating them with each other.

Still another mode of the present invention provides a storage medium for storing a display-information deciding program to be executed by a display-information deciding apparatus for transmitting display information to an information terminal provided with a display screen and an input unit, wherein the program includes;
- (a) a program code for instructing the display-information deciding apparatus to analyze a page template specified by a display-information obtaining request sent from the information terminal,
- (b) a program code for instructing the display-information deciding apparatus to obtain display-area specifying information and display attribute information from the page template,
- (c) a program code for instructing the display-information deciding apparatus to obtain a plurality of pieces of content specifying information related to display-area specifying information,
- (d) a program code for instructing the display-information deciding apparatus to inspect a plurality of display conditions respectively related to each of the pieces of content specifying information and judge whether each display condition has a content to be embedded in the page template,
- (e) a program code for instructing the display-information deciding apparatus to shape at least one content judged as a content to be embedded in the page template in accordance with the display attribute information, and (f) a program code for instructing the display-information deciding apparatus to transmit the shaped content to the information terminal.

Still another mode of the present invention provides a storage medium for storing a display-information deciding program to be executed by a display-information deciding apparatus for transmitting display information to an information terminal provided with a display screen and an input unit, wherein the program includes;

(a) a program code for instructing the display-information deciding apparatus to analyze a page template specified by a display-information obtaining request sent from the information terminal, (b) a program code for instructing the display-information deciding apparatus to obtain display-area specifying information from the page template, (c) a program code for instructing the display-information deciding apparatus to obtain a plurality of banner beans related to display-area specifying information in the display-information deciding apparatus, (d) a program code for instructing the display-information deciding apparatus to inspect a plurality of schedule conditions respectively related to each of the banner beans and judge whether each schedule condition is a bean including a banner to be embedded in the page template, (e) a program code for instructing the display-information deciding apparatus to obtain display-image specifying information and link-destination-URL specifying information from the banner bean judged as a bean including a banner to be embedded in the page template, and (f) a program code for instructing the display-information deciding apparatus to transmit display image data corresponding to the display-image specifying information and character string information corresponding to the link-destination-URL specifying information to the information terminal.

Still another mode of the present invention provides a storage medium for storing a display-information deciding program to be executed by a display-information deciding apparatus for transmitting display information to an information terminal provided with a display screen and an input unit, wherein the program includes;

(a) a program code for instructing the display-information deciding apparatus to analyze a page template specified by a display-information obtaining request sent from the information terminal, (b) a program code for instructing the display-information deciding apparatus to obtain display-area specifying information from the page template, (c) a program code for instructing the display-information deciding apparatus to obtain a plurality of pieces of content specifying information related to display-area specifying information, (d) a program code for instructing the display-information deciding apparatus to inspect a plurality of display conditions respectively related to each of the pieces of content specifying information and judge whether each display condition has a content to be embedded in the page template, and (e) a program code for instructing the display-information deciding apparatus to transmit at least one content judged as a content to be embedded in the page template to the information terminal.

Still another mode of the present invention provides a storage medium for storing an object to be accessed by a display-information deciding apparatus for transmitting the corresponding display information in response to a request for obtaining an HTML file including a Servlet defining section containing display-area specifying information as a parameter sent from an information terminal provided with a display screen and an input unit, comprising:

(a) a part bean holding content specifying information for specifying the content of a part displayed in the display area as a property; and (b) an arrangement object for holding the part bean, the display-area specifying information, and information serving as a condition for the part to be displayed in the display area by relating them with each other.

Still another mode of the present invention provides a storage medium for storing an object to be accessed by a display-information deciding apparatus for transmitting the corresponding display information in response to a request for obtaining an HTML file including a Servlet defining section containing display-area specifying information and display attribute information as parameters sent from an information terminal provided with a display screen and an input unit, comprising:

(a) a banner bean holding banner-display-image specifying information for specifying the display image of a banner displayed in the display area and banner-link-destination-URL specifying information for specifying the link destination URL of the banner as properties; and (b) an arrangement object for holding the banner bean, the display-area specifying information, and schedule information serving as a condition for the banner to be displayed in the display area by relating them with each other.

BRIEF DESCRIPTION OF THE DRAWINGS

For a more complete understanding of the present invention and for further advantages thereof, reference is now made to the following Detailed Description taken in conjunction with the accompanying drawings, in which:

FIGS. 2A and 2B illustrate a block diagram of processing elements in a preferred embodiment of the present invention;

FIGS. 7A and 7B are a message flow showing a part creation procedure in a preferred embodiment of the present invention;

FIG. 8 is a message flow showing a part creation procedure in a preferred embodiment of the present invention;

FIGS. 10A and 10B are a message flow showing a part arrangement procedure in a preferred embodiment of the present invention;

FIG. 11 is a message flow showing a part arrangement procedure in a preferred embodiment of the present invention;

FIGS. 16A and 16B are a message flow showing a procedure for generating a content to be embedded in a display area in a preferred embodiment of the present invention;

FIG. 18 is an illustration showing codes for defining a display area in a preferred embodiment of the present invention;

FIG. 19 is a conceptual view of an arrangement rule DB in a preferred embodiment of the present invention;

FIG. 24 is a conceptual view of an arrangement DB in a preferred embodiment of the present invention;

FIG. 26 is a conceptual view showing the information controlled by a user control DB in a preferred embodiment of the present invention;

FIG. 27 is a conceptual view showing control items of a subscription DB in a preferred embodiment of the present invention;

FIGS. 28A and 28B are a message flow showing a procedure for monitoring and communicating an event in a preferred embodiment of the present invention;

DETAILED DESCRIPTION OF THE INVENTION

A. Hardware Configuration

Figure 1:
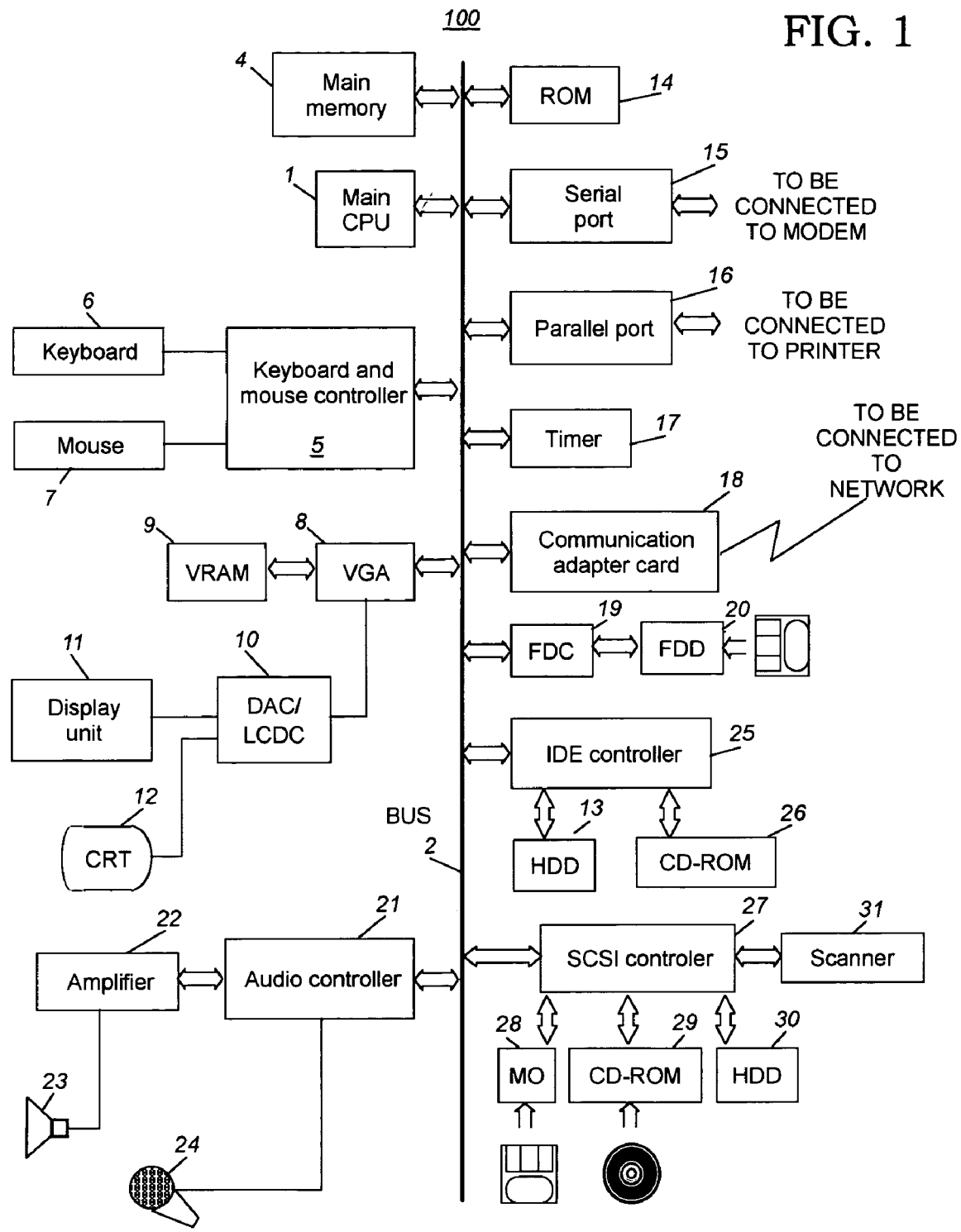
FIG. 1 is a block diagram showing an embodiment of the present invention constituted of the hardware such as an information terminal, a web server and a client machine.
Figure 2A:
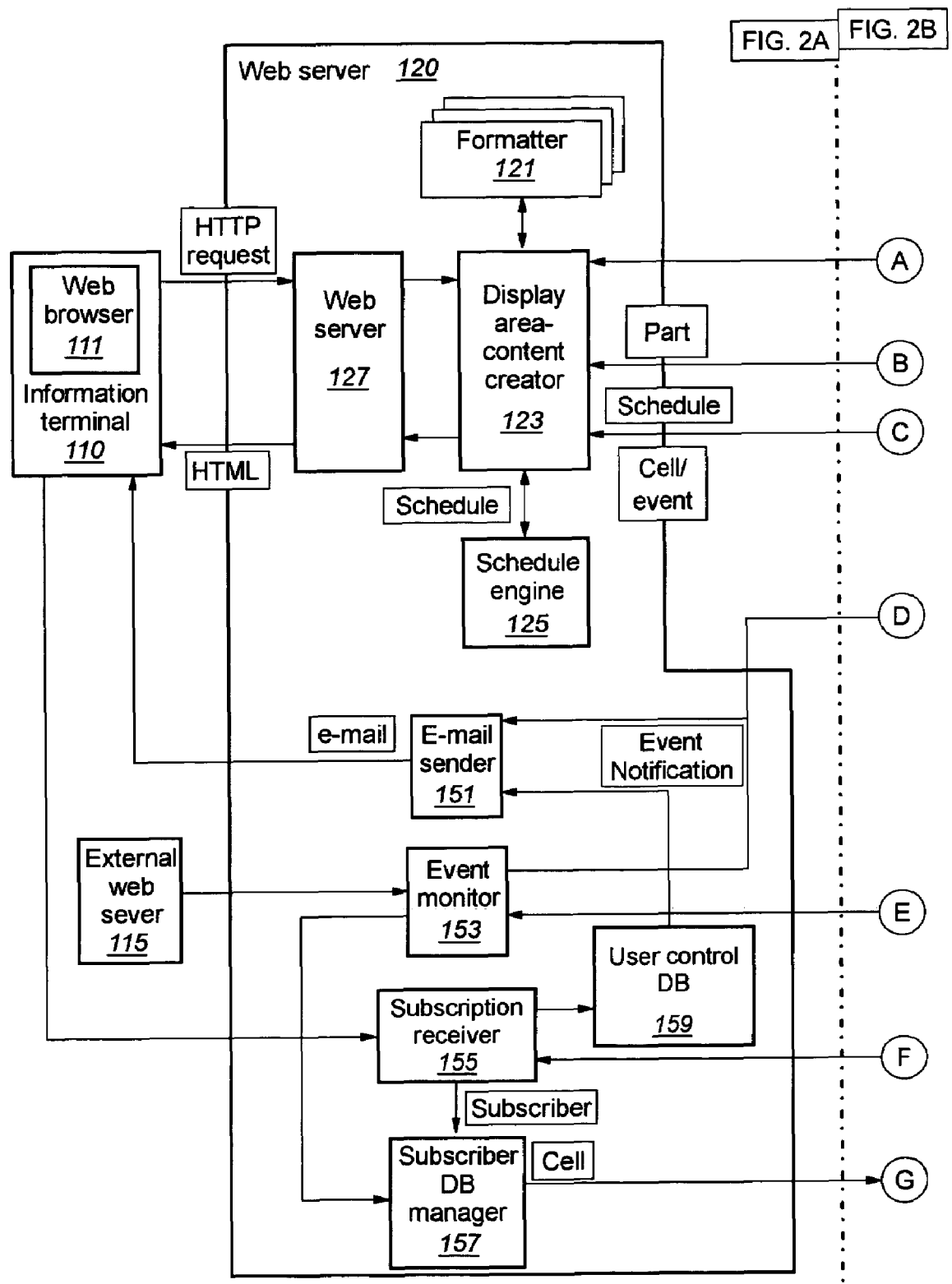

Referring to FIGS. 1, 2A and 2B, a hardware configuration is shown for operating an information terminal 110, a web server 120, and a client machine 130 of the present invention. The information terminal 110, web server 120 and client machine 130 include a central processing unit (CPU) 1 and a memory 4. The CPU 1 and the memory 4 connect with hard disk drives 13 and 31, respectively serving as an auxiliary memory through a bus 2 and the like. A floppy disk drive 20 (or a media driving unit 26, 28, 29, or 30 such as MO 28 or CD-ROM 26 or 29) is connected to the bus 2 through a floppy disk controller 19 (or one of various other controllers such as an IDE controller 25 and SCSI controller 27).

A floppy disk (or a medium such as MO or CD-ROM) is set to the floppy disk drive 20 (or one of the media driving units 26, 28, 29, or 30 such as an MO or CD-ROM). It is possible to record the code of a computer program for providing instructions for a CPU in cooperation with an operating system to execute the present invention in storage media such as the floppy disk, hard disk drive 13, or ROM 14, and the program is executed by loading the program in the memory 4. It is also possible to compress the code of the computer program or divide the code into a plurality of parts and record them in a plurality of media.

It is possible to further constitute the information terminal 110, web server 120, and client machine 130 as a system provided with user interface hardware. The user interface hardware includes a pointing device 7 (mouse, joy stick, or track ball) for inputting screen position information, a keyboard 6 for supporting key input, and displays 11 and 12 for showing image data to a user. Moreover, a loudspeaker 23 receives an audio signal from an audio controller 21 through an amplifier 22 and outputs the signal as a voice.

The information terminal 110, web server 120, and client machine 130 are able to communicate with other computers or the like through a serial port 15 and a modem, or a communication adapter 18 or the like such as a token ring or the like.

The present invention can be embodied by a computer built in a household electric appliance such as a normal personal computer (PC), work station, television, or FAX or by combining the personal computer, work station, television, and FAX. However, these components are shown as examples, and thus, every component cannot serve as an indispensable component of the present invention. Particularly, because the present invention is used to dynamically change contents to be embedded in a page template, components such as the audio controller 21, amplifier 22, and loudspeaker 23 are not indispensable for a mode of the present invention.

An operating system for the information terminal 110, web server 120, and client machine 130 can be an OS for standard support of the GUI multiwindow environment such as Windows NT (trade mark of Microsoft), Windows 9x (trade mark of Microsoft), Windows 3.x (trade mark of Microsoft), OS/2 (trade mark of IBM), MacOS (trade mark of Apple), Linux (trade mark of Linus Torvlds), or X-WINDOW system (trade mark of MIT) on AIX (trade mark of IBM), or an OS under a character-base environment such as PC-DOS (trade mark of IBM) or MS-DOS (trade mark of Microsoft), or an OS built in a network computer such as real-time OS or Java OS including OS/Open (trade mark of IBM) or VxWorks (trade mark of Wind River Systems, Inc.). Therefore, the operating system is not restricted to a particular operating-system environment.

B. System Configuration

FIG. 2 is a functional block diagram showing the configuration of a system including a web-page generation system of a preferred embodiment of the present invention.

A web browser 111 is installed in the information terminal 110. The web browser 111 designates a URL and transmits an HTTP request to the predetermined web server 120. Moreover, the web browser 111 receives a response from the web server 120 and displays it on a display screen.

The web server machine 120 of a preferred embodiment of the present invention is provided with a formatter 121, a display-area content creator 123, a schedule engine 125, a web server program 127, an e-mail sender 151, an event monitor 153, a subscription receiver 155, and a subscriber DB manager 157.

The formatter 121 formats contents of various resources into a predetermined form in accordance with the attribute information (display position, height, width, style, and format) set to a display area to be mentioned later.

The display-area content creator 123 retrieves prospective contents to be embedded in a page template out of an arrangement rule DB and narrows down a content to be displayed out of the prospective contents in accordance with conditions such as a schedule and a customer cell. Moreover, the creator 123 supplies the content to be displayed and the information set to a display area to the formatter 121, receives the formatted content, embeds the content in the page template, and returns it to the web server 127.

The schedule engine 125 judges whether the time when a user makes an access meets a condition for schedule definition. It is also possible to set a condition for schedule definition by combining a day of the week and a time zone in addition to a period.

The subscription receiver 155 provides a list of published event parts registered in an arrangement rule DB manager 143 to be described later for a user and registers the ID of a part selected by the user, a conditional expression, a notification type, and user information extracted from a user control DB 159 in the subscriber DB 157.

The event monitor 153 regularly monitors the content of the subscriber DB 157 and moreover monitors a resource (in the case of FIG. 2, an external web server 115) outside or inside of a monitoring object. Moreover, when the resource coincides with a predetermined condition, the monitor 153 accesses the subscriber DB 157 by using the condition as a key, refers to a notification type, and executes the processing corresponding to the notification type.

The e-mail sender 151 fetches an e-mail part from the arrangement rule DB 143 in response to a designation of the event monitor 153, embeds predetermined information in the part to generate an e-mail, and outputs the e-mail. The user control DB 159 controls customer information.

The client machine 130 is provided with a template parser 131, a resource manager 133, a resource DB manager 135, a page designer 137, a component DB manager 141, and an arrangement rule DB manager 143.

The template parser 131 analyzes a page template, detects a display area included in the template, and extracts attributes (display position, height, width, style, and format) of the area.

The resource manager 133 provides an operator with a GUI for registering, changing, or deleting a Java bean. In the case of a preferred embodiment of the present invention, an object such as a page template, banner, telop, or button and a customer cell (a user group for displaying different information when display contents are changed by a user is referred to as customer cell) are also registered in a resource DB as Java beans. Each bean has a Java object code and an attribute, executes the Java object code by making an inquiry with a common interface and fetches a list of attributes held by beans. For example, a banner bean has such attributes as type of bean, part name, image file to be displayed, link-destination URL, and descriptive text. In the case of a preferred embodiment of the present invention, a page template is registered as a Java bean in order to improve the versatility.

The resource DB manager 135 controls a resource DB. The resource DB controls a part before attribute information is set. In the case of a preferred embodiment of the present invention, only the type of a part (page template, telop, or banner) and bibliographical matters are registered in a part controlled by a resource DB but the part does not have any real attribute such as the type of an image to be displayed. According to the above configuration, it is possible to accelerate retrieval.

The component DB manager 141 controls a component DB. The component DB controls the attribute information of a part. For example, when the part is a banner bean, the component DB controls the information including a part name, image file to be displayed, link-destination URL, and descriptive text.

The arrangement rule DB manager 143 controls an arrangement rule DB. The arrangement rule DB stores the information for relating a display area with a part, schedule information, and information for judging the possibility of publication. An operator can obtain a list of parts stored in the DB by using a page template name or display area name as a key.

The page designer 137 provides an operator with a GUI for making it possible to register and change arrangement of parts, set a schedule, determine publication or the like.

Figure 3:
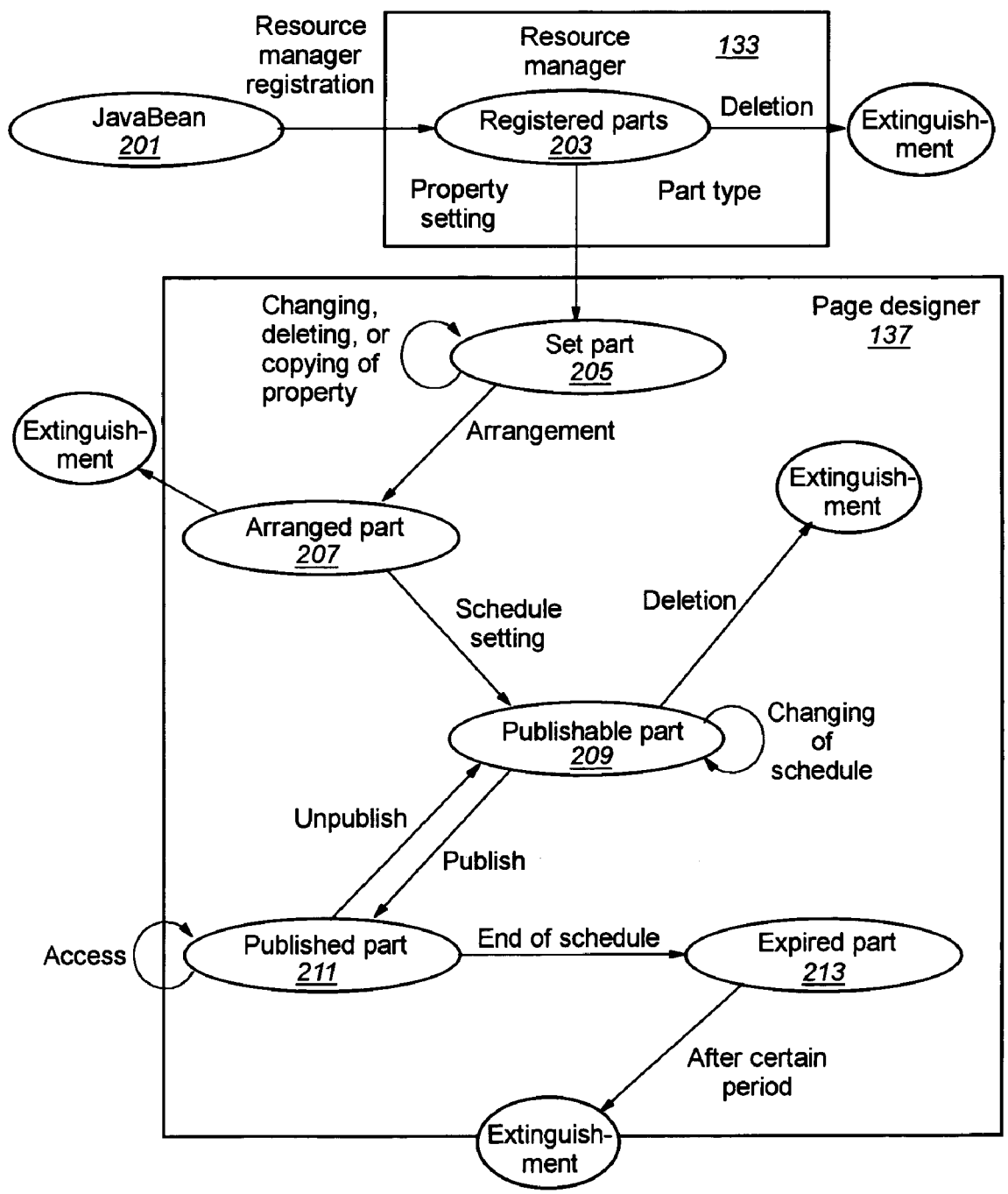
FIG. 3 is a conceptual view showing the state transition of parts in a preferred embodiment of the present invention.

FIG. 3 is a conceptual view showing the state transition of parts in a preferred embodiment of the present invention. In FIG. 3, a registered part 203 (class) is the information (metadata) registered through the management of the resource manager 133, which can be changed or deleted. The registered part 203 is stored in the resource DB 135. At this stage, only the type of part (page template, telop, or banner) and bibliographical matters are registered in the part, but the part does not have any real attribute such as the type of an image to be displayed.

A set part 205 (instance) is a part obtained by relating the information (banner, telop, or list) set by each part property to the registered part 203, which can be changed or deleted. The set part 205 is stored in the arrangement rule DB 143. Under this state, the set part 205, when it is a banner bean, has attributes such as type of bean, part name, image file to be displayed, link-destination URL, and descriptive text. The attributes are stored in a component DB. In the case of a preferred embodiment of the present invention, an operator is able to refer to and select the contents registered in a resource DB when setting the property of a part.

An arranged part 207 is a part obtained by relating a display area to the set part 205, which can be deleted. The set part 205 is stored in the arrangement rule DB 143.

A publishable part 209 is a part obtained by schedule-setting an arranged part, which can be changed or deleted. The publishable part 209 is stored in the arrangement rule DB 143. A published part 211 is obtained by publishing a publishable part. It is also possible to change the published part 211 to the publishable part 209 through unpublished operation. The publishable part 209 is stored in the arrangement rule DB 143. An expired part 213 is the publishable part 209 with a schedule completed or the published part 211.

In the case of a preferred embodiment of the present invention, the information for relating a display area with a part is stored in an arrangement rule DB in order to decrease the time for retrieving parts arranged in a predetermined display area. However, it is also possible to implement the invitation by assigning such information to individual parts. Moreover, in order to decrease the time for determining a part meeting a schedule condition among the parts arranged in a predetermined display area, a schedule is also stored in an arrangement rule DB together with each arrangement data value. However, it is also possible to decrease the time by providing the information for each part. Similarly, though the information showing whether published or not is controlled by an arrangement rule DB, it is also permitted to control the information by a component DB as the attribute of a part.

Functional blocks shown in FIG. 2 are described above. These functional blocks are logical functional blocks that cannot be realized by each consistent hardware or software but it can be realized by combined or common hardware and software. Particularly, in the case of the above example, the web server 120 and the client machine 130 are mounted on different machines. However, it is also possible to provide the function described for the client machine 130 for the web server 120. Moreover, not every functional block shown in FIG. 2 is a component indispensable for the present invention.

C. Operation Procedure

C-1. Registration of Contents

Figure 4:
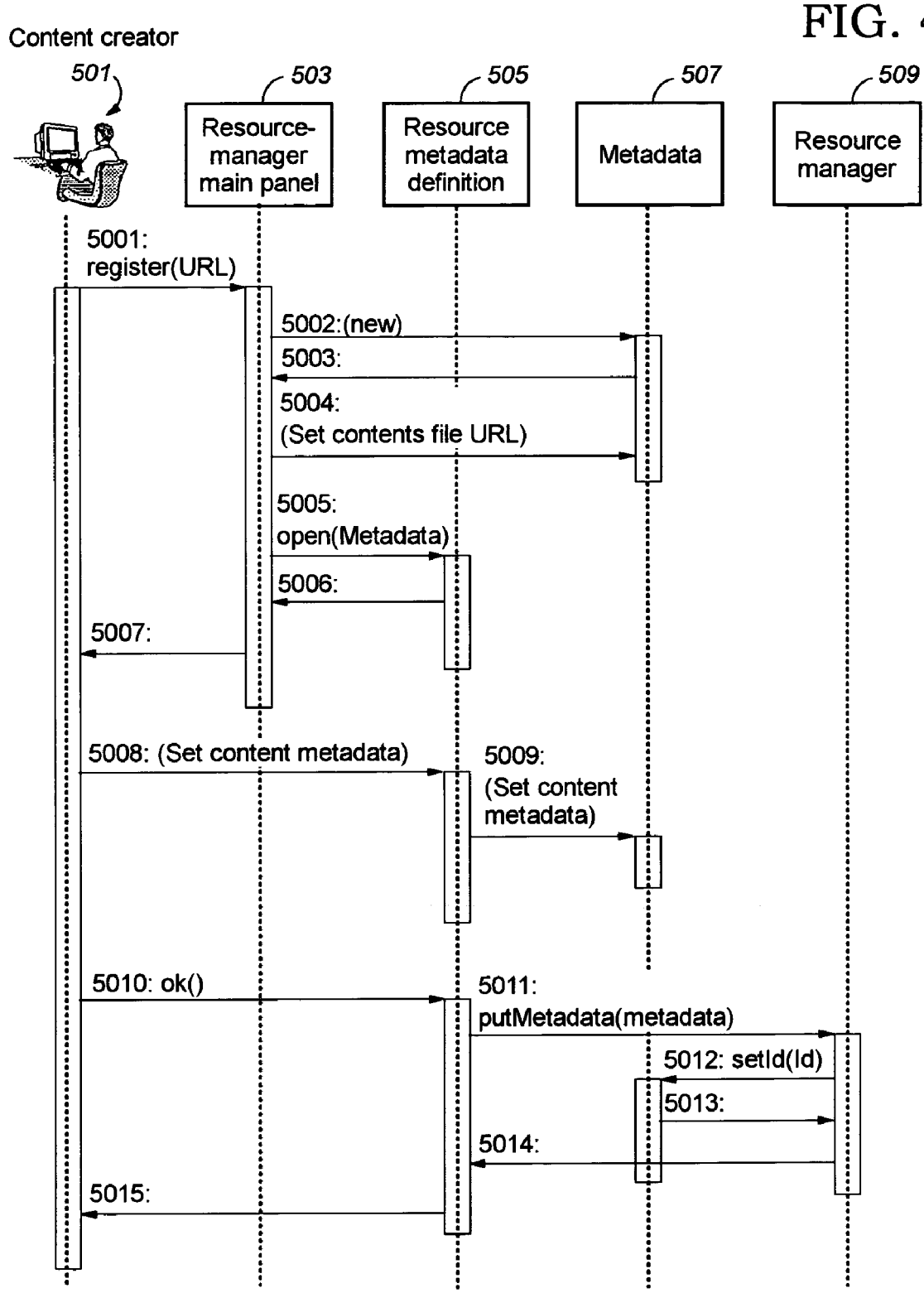
FIG. 4 is a message flow showing a content registration procedure in a preferred embodiment of the present invention.

FIG. 4 is a message flow showing a content registration procedure in a preferred embodiment of the present invention. As shown in FIG. 4, a content creator 501 opens a resource-manager main panel 503 provided by a resource manager 133, designates a created content (in the case of a preferred embodiment of the present invention, a place where a content is present, that is, a URL is designated), and registers the content (message 5001).

The resource-manager main panel 503 generates metadata 507 on a memory in response to the registered content (messages 5002 and 5003). When generation of the metadata is normally completed, the main panel 503 registers the URL of the content in the metadata 507 (message 5004). Then, the resource-manager main panel 503 opens a resource metadata definition panel 505 (messages 5005, 5006, and 5007).

The content creator 501 inputs bibliographical matters (creator, creation date, and explanation of content) to the resource metadata definition panel 505. Moreover, in the case of a preferred embodiment of the present invention, a registration date and registration time are automatically set and the type of a content can be selected from a pull-down menu. When the content creator 501 presses an OK button on the resource metadata definition panel 505, metadata (including the information linked to a content) is written in a resource DB 509 and moreover, an ID intrinsic to the content is generated and set to the resource DB 509 by relating the ID with the metadata (messages 5010, 5011, 5012, 5013, 5014, and 5015).

C-2. Registration of Page Template

Figure 5:
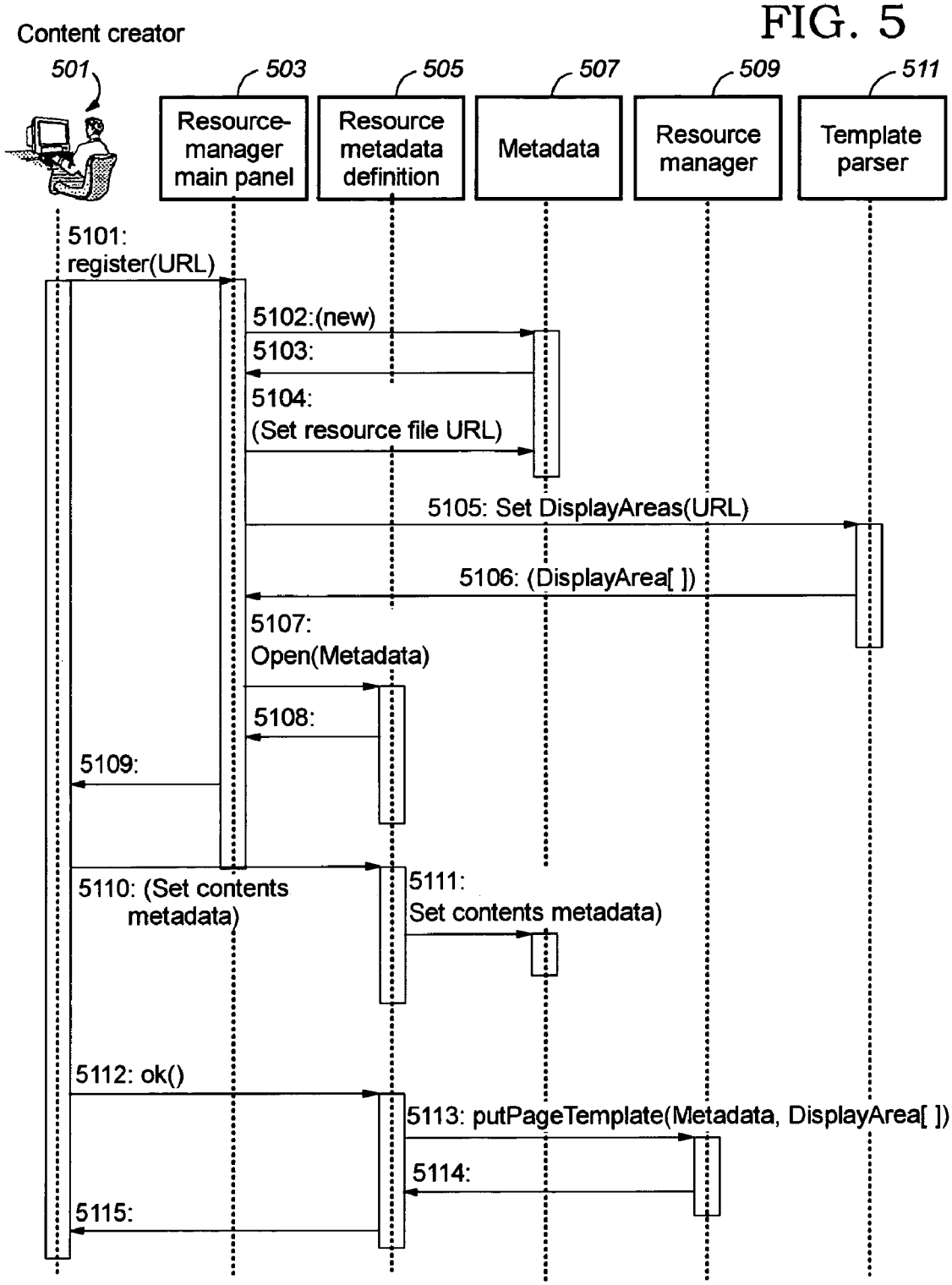
FIG. 5 is a message flow showing a page template registration procedure in a preferred embodiment of the present invention.

FIG. 5 is a message flow showing a page template registration procedure in a preferred embodiment of the present invention. As shown in FIG. 5, a content creator 501 opens a resource-manager main panel 503 provided by a resource manager 509, designates a page template (in the case of a preferred embodiment of the present invention, a place where a content is present, that is, a URL is designated) and registers the page template (message 5101).

The resource-manager main panel 503 generates metadata 507 on a memory in response to the registered page template (messages 5102 and 5103). When generation of the metadata 507 is normally completed, the URL of a content is registered in the metadata 507 (message 5104).

Figure 6:
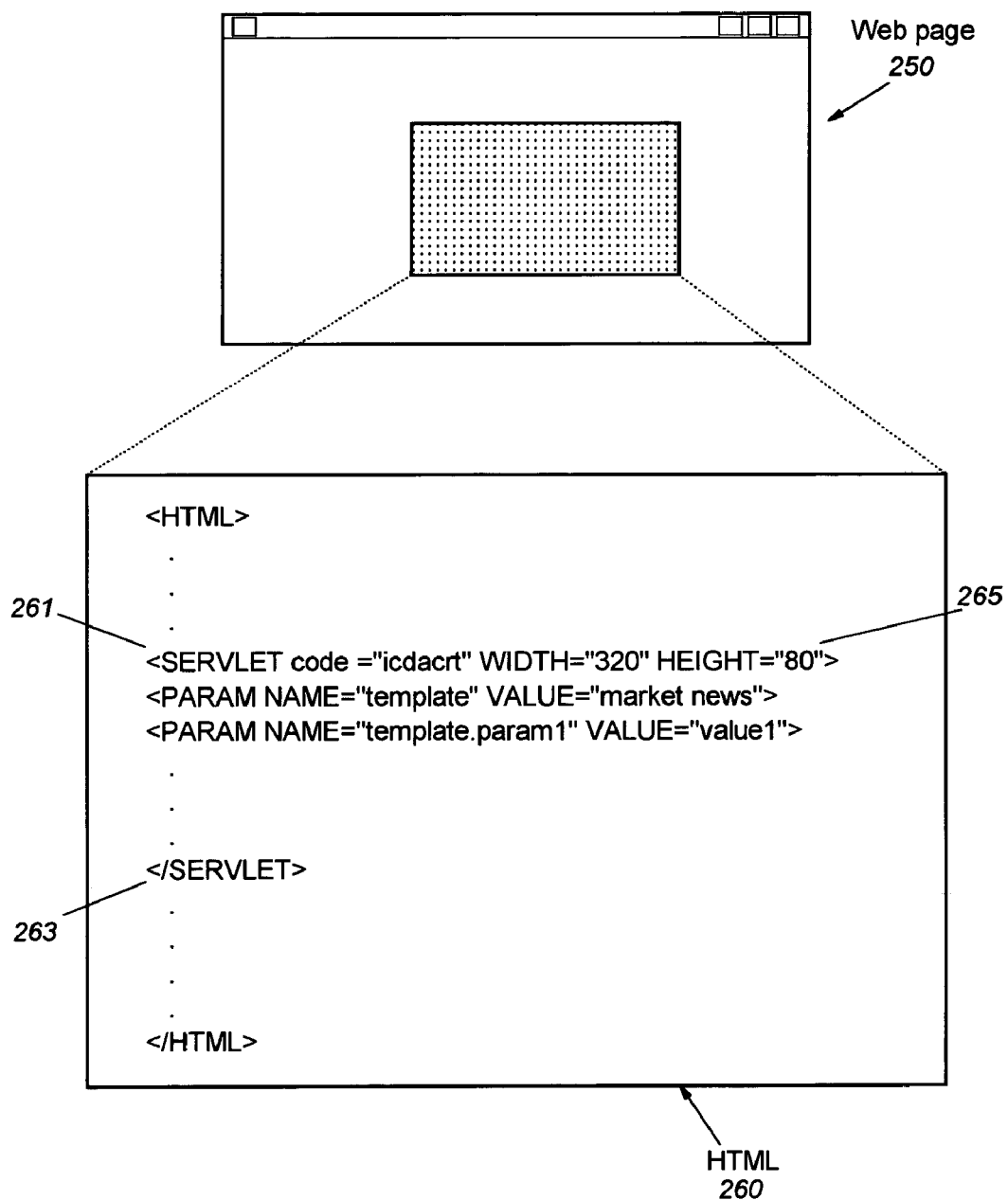
FIG. 6 is a conceptual view for explaining a page template in a preferred embodiment of the present invention.

Then, the resource-manager main panel 503 supplies the URL to a template parser 511 to request the parser 511 to analyze a display area (message 5105). The template parser 511, as shown in FIG. 6, accesses a page template 250 to analyze a display area included in the page template 250. In the case of a preferred embodiment of the present invention, a Servlet for defining a display area is recognized by retrieving Servlet tags 261 and 263 included in the HTML and detecting a character string [code="icdacrt"].

When a display area is recognized, the information for what number the display area is included in a page template, display area name, display position, display style, width, height or the like is recognized for every display area included in the page template (message 5106).

Moreover, the resource-manager main panel 503 opens a resource metadata definition panel 505 (messages 5005, 5006, and 5007). The content creator 501 inputs bibliographical matters (creator, creation date, and explanation of template) in the resource metadata definition panel 505. Moreover, in the case of a preferred embodiment of the present invention, a registration data and registration time are automatically set.

When the content creator 501 presses an OK button on the resource metadata definition panel 505, the resource metadata definition panel 505 writes metadata (including the information linked to a content) and the display area information (display area number, display area name, display position, display style, width, and height) recognized by a template parser 511 in a resource DB 509 (messages 5112, 5113, 5114, and 5115).

C-3. Setting of Part Attribute (Creation of Part)

Figure 9:
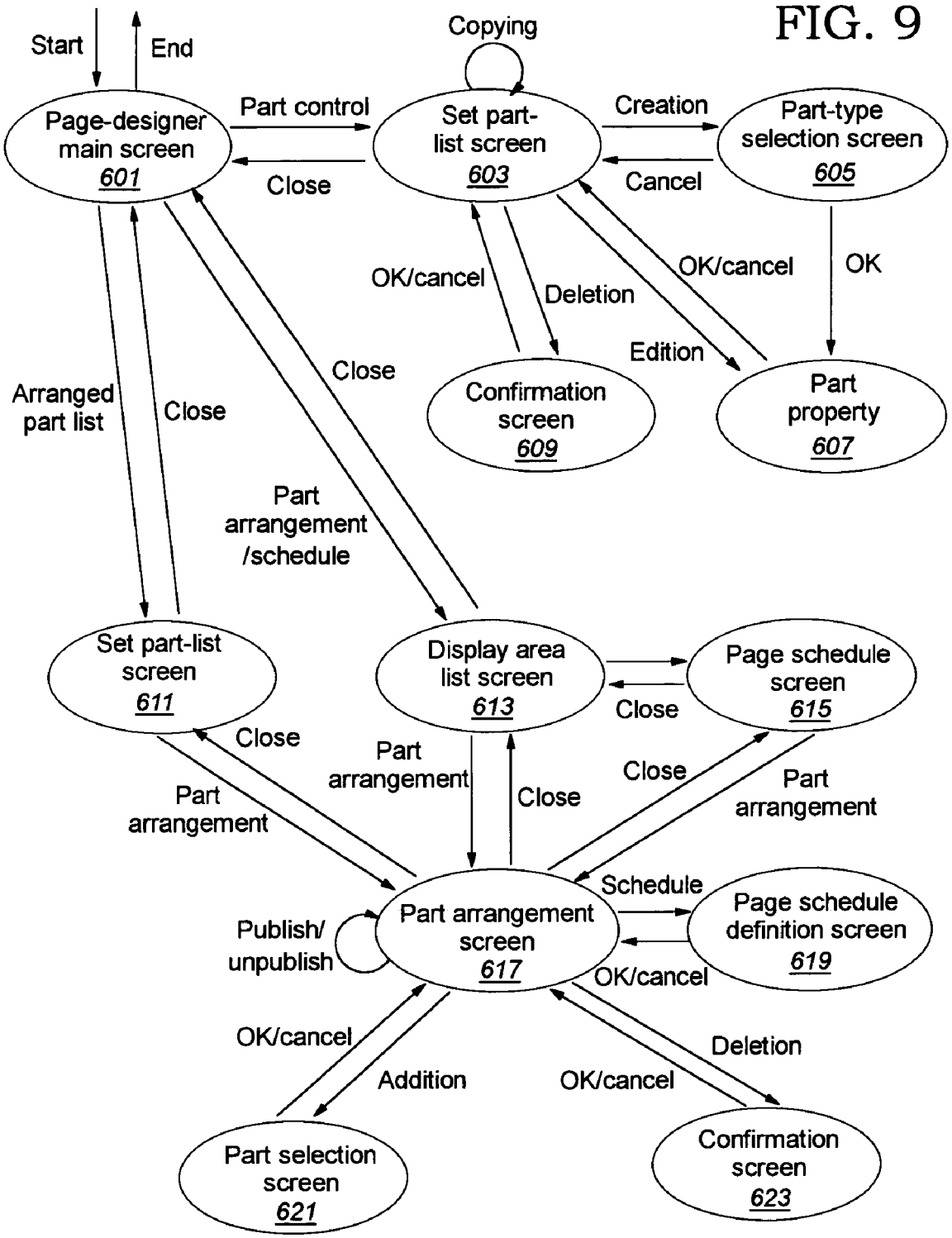
FIG. 9 is a conceptual view showing the screen configuration of a page designer in a preferred embodiment of the present invention.

FIGS. 7A, 7B (collectively, FIGS. 7) and 8 are a message flow showing a part creation procedure in a preferred embodiment of the present invention. As shown in FIG. 7, when a web page creator 521 opens a defined part list panel 523 from a page-designer main screen (message 5201) and selects part creation (message 5202), a part-type selection panel 525 is opened. FIG. 9 shows the screen configuration of a page designer 137 of a preferred embodiment of the present invention.

When the web page creator 521 selects "part type" on the part-type selection screen 525, the metadata for a registered part corresponding to the part type is obtained from a resource DB 135 (messages 5203 and 5204). Moreover, a part ID and a part name that can be identified for each part type are assigned (messages 5205, 5206, 5207, 5208, and 5209).

When the web page creator 521 confirms a part type (message 5210), a new part 531 is generated (messages 5211 and 5212), the metadata for a registered part or the name of the creator is set (messages 5213 to 5216), and a part property definition panel 533 opens (messages 5217 to 5219).

The web page creator 521 sets a predetermined property (telop message or link-destination URL not registered as a list), part name, and descriptive text to the part property definition panel 533 (messages 5221 to 5227).

The web page creator 521 can open a content selecting panel 537 from the part property definition panel 533 and access a content of an image or text registered in a resource DB 527 (messages 5228 to 5234). For example, in the case of a banner part, it is possible to obtain a list of images or link-destination URLs to be displayed. In the case of a telop part, it is possible to obtain a list of messages to be output.

When the web page creator 521 selects a predetermined content from a list of contents, the information for contents stored in the resource DB 135 is registered as a part property (message 5235 to 5241). Moreover, when the web page creator 521 performs final confirmation of the part property definition panel 533, part information, part ID, and changed history information are registered in a component DB 535 (messages 5242 to 5249).

C-4. Arrangement of Parts

FIGS. 10A, 10B (collectively, FIGS. 10) and 11 are a message flow showing a part arrangement procedure in a preferred embodiment of the present invention. As shown in FIG. 10, a content creator 541 first accesses a part selection panel 545 through a part arranging panel 543 (messages 5301 and 5302) to obtain a display area in which parts registered in a resource DB 537 will be arranged (messages 5303 and 5304). Then, the creator 531 obtains the attribute information (display position, height, width, style, and format) for the display area (messages 5305 and 5306).

In the case of a preferred embodiment of the present invention, there is a display area style that is one of pieces of display area attribute information. The display area style is attribute information for designating the type of the display format of a part selected (in accordance with the condition of a cell or schedule) (by using the HTML). The display style includes, for example, bannerFlow (banner arrangement) and itemizedList (itemized list).

Types of parts that can be displayed and shaped are previously related to each display style by a resource manager. For example, a banner part (link-provided image file) is related to bannerFLow style and a ListItem part (link-provided one-line text) is related to itemizedList. In the case of a preferred embodiment of the present invention, the above relations are designated when registering a formatter for generating the HTML in a resource manager in accordance with each display style.

A list of parts to be attached to a display area displays types of parts which can be displayed in the display area by selecting the parts out of set parts in accordance with the information for relating a display area style with a displayable part type (messages 5303 to 5331).

Moreover, when the content creator 541 selects a desired part out of the list, the part is related to a display area and the relation between the part and the display area is stored in an arrangement rule DB 553.

C-5. Addition of Part to Display Area

Figure 12:
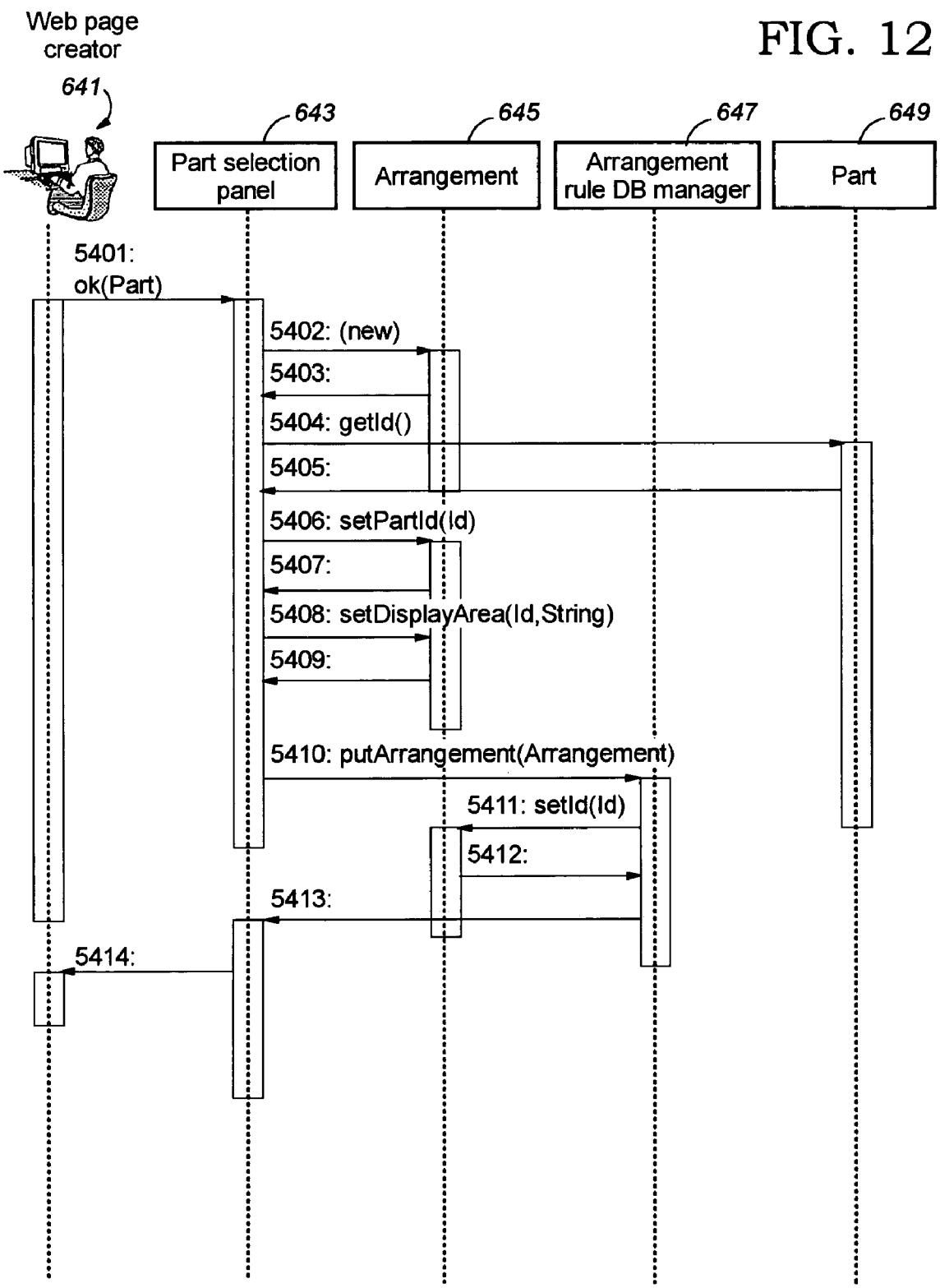
FIG. 12 is a message flow showing a procedure for adding a part to a display area in a preferred embodiment of the present invention.
Figure 13:
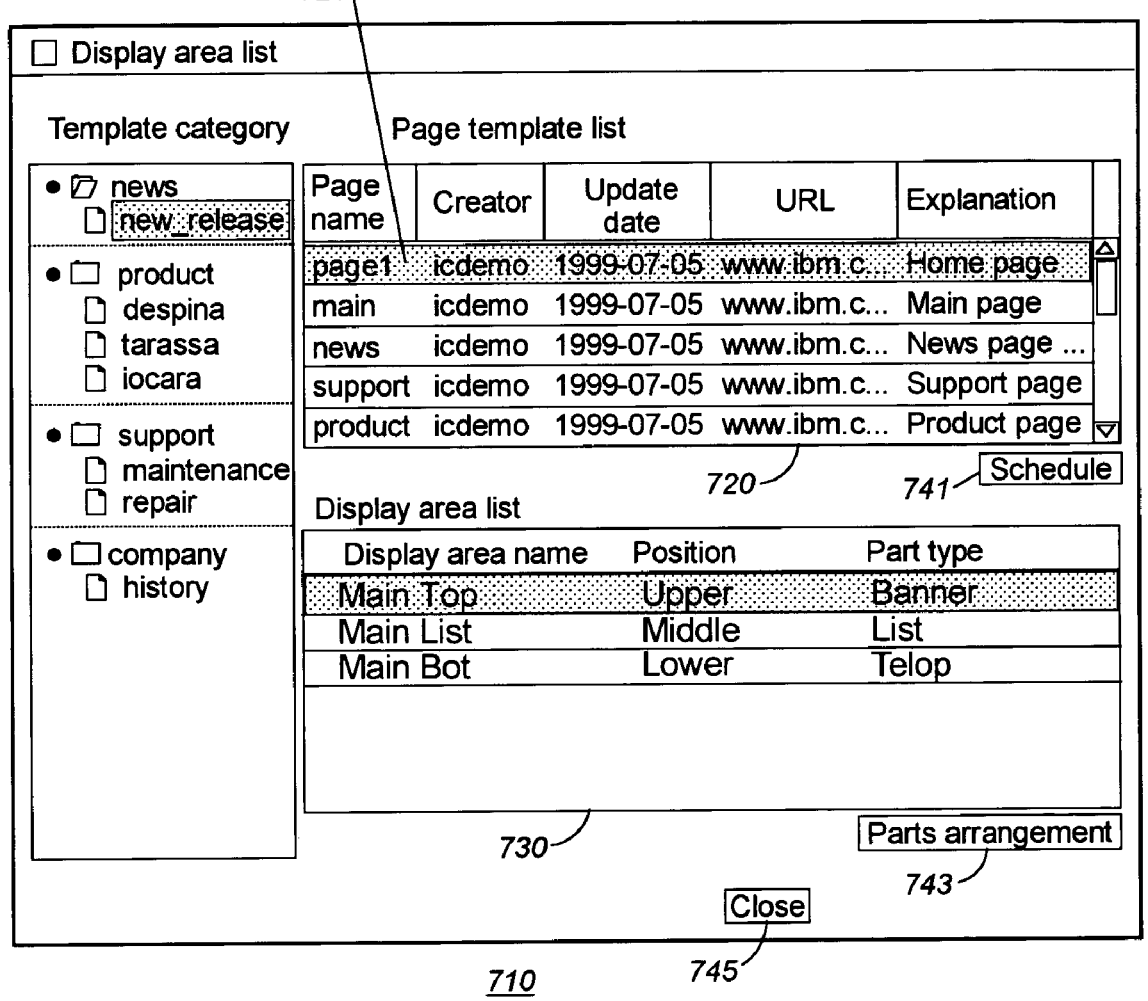
FIG. 13 is a conceptual view of a part selection panel in a preferred embodiment of the present invention.

FIG. 12 is a message flow showing a procedure for adding a part to a display area in a preferred embodiment of the present invention. In the case of a preferred embodiment of the present invention, a GUI panel is separately present which selects and correlates the display areas and parts shown in FIG. 13. By selecting a display area 621 out of the display area list 630 of the GUI panel and pressing a "part arrangement" button 643, the messages 5301 to 5331 in the sequence as shown in FIGS. 10 and 11, are processed. FIG. 12 is a message flow after the messages are processed.

When a web page creator 541 selects a predetermined part out of the parts displayed as a list on a part selecting panel 543 (message 5401), an arrangement object 545 is newly generated on a memory. Then, a part ID and a display area ID are set to the generated arrangement object 545 (messages 5404 to 5409) and written in an arrangement rule DB (messages 5410 to 5414).

C-6. Definition of Schedule

Figure 14:
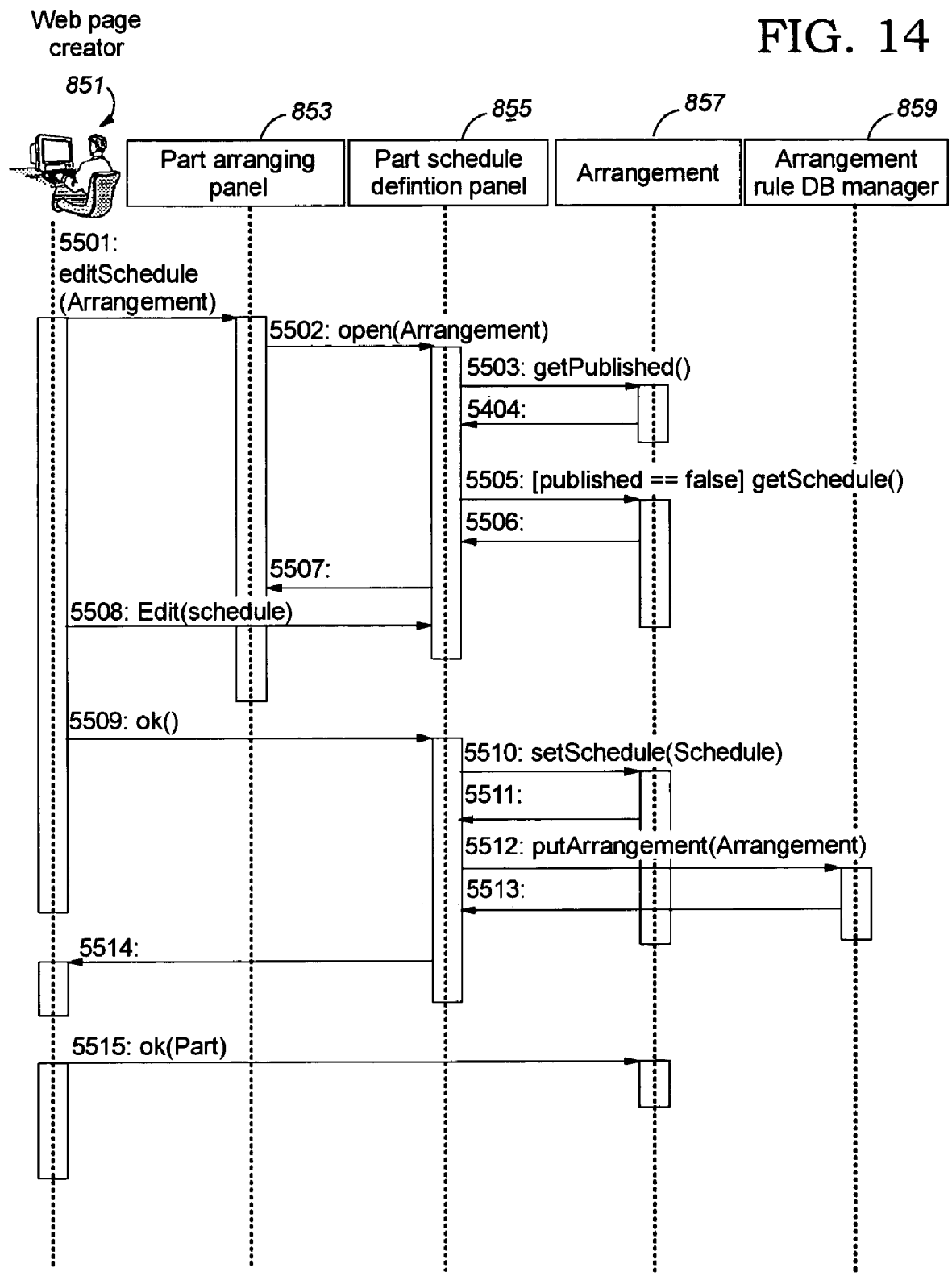
FIG. 14 is a message flow showing a procedure for defining a schedule for arranged parts in a preferred embodiment of the present invention.

FIG. 14 is a message flow showing a procedure for defining the schedule of arranged parts in a preferred embodiment of the present invention. As shown in FIG. 14, a web page creator 551 first designates a set of a display area and a part on a part arranging panel 553, opens a schedule defining panel 555 (messages 5501 and 5502), and accesses an arranged part to be schedule-registered (corrected) by the web page creator 551 (messages 5503 and 5504).

Moreover, if the arranged part is not published, the creator 551 obtains the schedule set to a current part in order to newly set a schedule or change schedules (message 5505). When a schedule is not set, a schedule registration screen with no data is output. When a schedule is already set, a schedule correction screen appears. In the case of a preferred embodiment of the present invention, schedules can be changed only in a state in which a part is not published (unpublished state) in order to prevent part display schedules from being changed while a general user sees.

C-7. Determination of Publication

Figure 15:
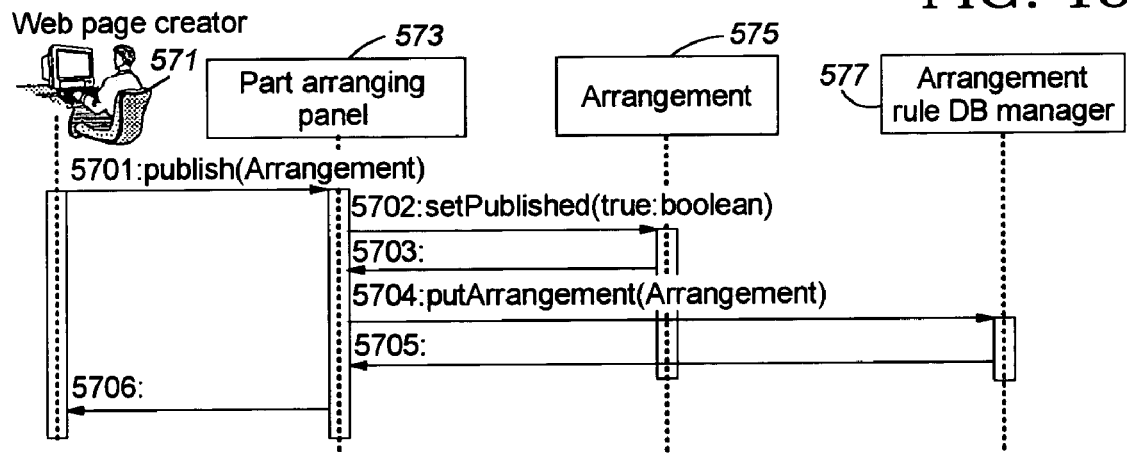
FIG. 15 is a message flow showing a procedure for determining publication of a content to be embedded in a display area in a preferred embodiment of the present invention.

FIG. 15 is a message flow showing a procedure for determining publication of a content to be embedded in a display area in a preferred embodiment of the present invention. As shown in FIG. 15, when a web page creator 571 designates Display area, Part, and Publish on a part arranging panel 573, a flag for publication is set to an arrangement object 575 (messages 5701 to 5703). Then, the content of the arrangement object is written in an arrangement rule DB. It is also possible to designate canceling of Publish (Unpublish) in accordance with the same procedure.

C-8. Generation of Content of Display Area

FIGS. 16A, 16B (collectively, FIGS. 16) and 17 are a message flow showing a procedure for generating a content to be embedded in a display area in a preferred embodiment of the present invention. As shown in FIG. 16, when a user 561 transmits an HTTP request to a web server 127 from a web browser 111, the web server 127 obtains a page template corresponding to the HTTP request.

The web browser 127 detects a Servlet tag included in the page template, hands over codes (FIG. 18) included in the Servlet tag to a display-area content creator 563 (message 5601) and waits until receiving a result.

Moreover, the display-area content creator 563 obtains a display area (messages 5602 and 5603) and obtains the metadata for a template including the display area from a resource DB 567 (messages 5604 and 5605). In the case of a preferred embodiment of the present invention, a display area is controlled in accordance with a display area name 701 and it is possible to access the resource DB 567 or an arrangement rule DB 565 by using the display area name 701 as a key.

An arrangement object is gotten by using the display area name 701 and a page template ID 725 (gotten through message 5605) as keys and thereby accessing an arrangement rule DB of a display area (messages 5606 and 5607). Moreover, though a preferred embodiment of the present invention obtains an arrangement object by using the display area name 701 and page template ID 725 as keys, it is also possible to make an access by changing a display area name to a name which can be uniquely specified for every page template and thereby using only a display area name as a key.

In the case of the example in FIG. 19, arrangement objects (Part ID) 0001 and 0002 are gotten. Pieces of schedule information 727 and 728 are fetched from the gotten arrangement objects (messages 5608 and 5609) to inquire of a schedule engine 571 about the validity of the pieces of schedule information (messages 5610 and 5611). Moreover, it is confirmed that parts of pieces of schedule information are published (messages 5612 and 5613). In the case of the example in FIG. 19, the arrangement objects 0001 and 0002 are published. When the time is assumed to be 19:00 on Jul. 26, 1999 at present, the arrangement object 0001 is not fitted for a schedule condition but the arrangement object 0002 is fitted for the schedule condition in the case of the example in FIG. 19.

If it is judged that a schedule is valid and a part is published, a component DB 575 is accessed to obtain the information for a display image file, link-destination URL, and descriptive text corresponding to the part (messages 5714 and 5715).

Figure 20:
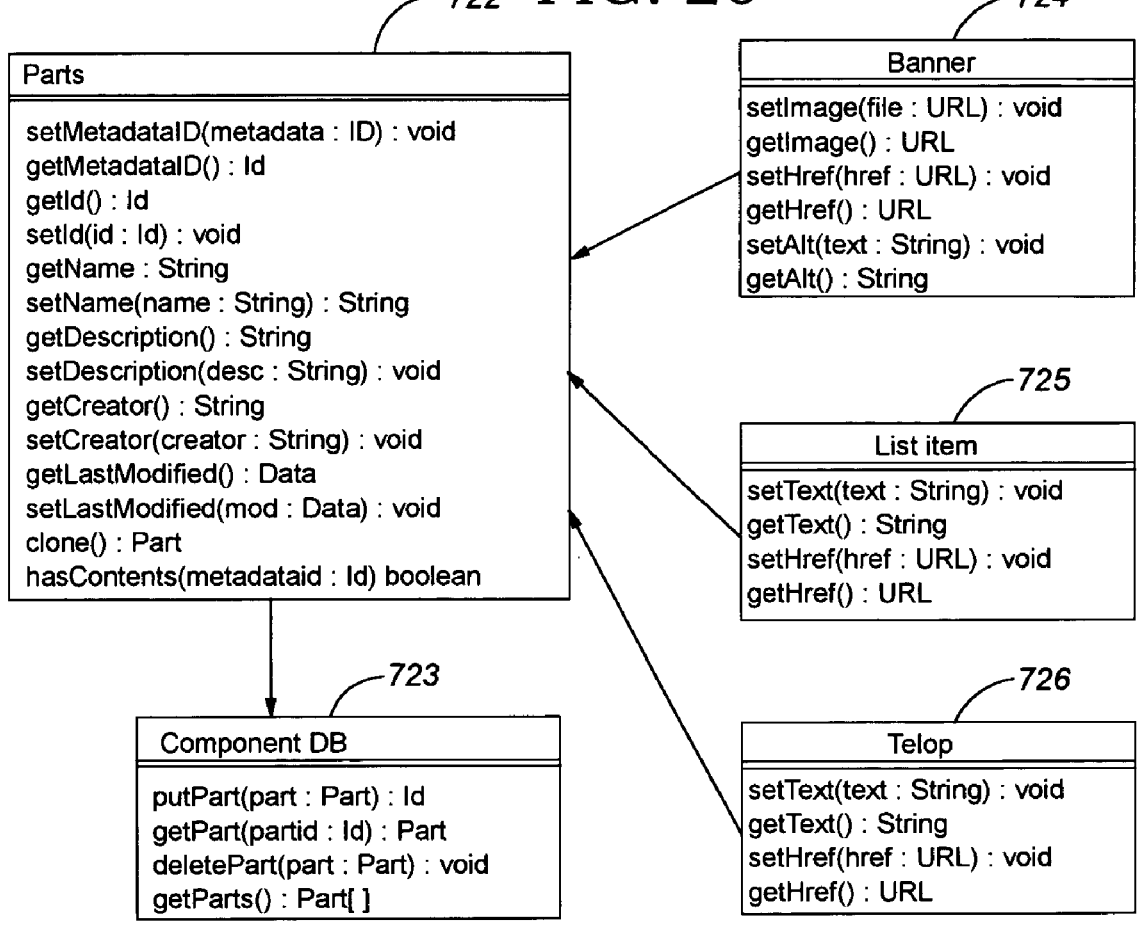
FIG. 20 is a conceptual view of a component DB in a preferred embodiment of the present invention.

FIG. 20 is a conceptual view of a component DB in a preferred embodiment of the present invention. In the case of a preferred embodiment of the present invention, a banner 750, list item 760, and telop 770 are registered as not a simple table but objects in order to correspond to a plurality of objects. Content information such as the information for specifying an actual banner display image (e.g. path name, directory name, or file name) is set as the property of a banner object 750. A system can obtain content information and image information by inquiring of a key about a part name or a part ID.

Figure 21:
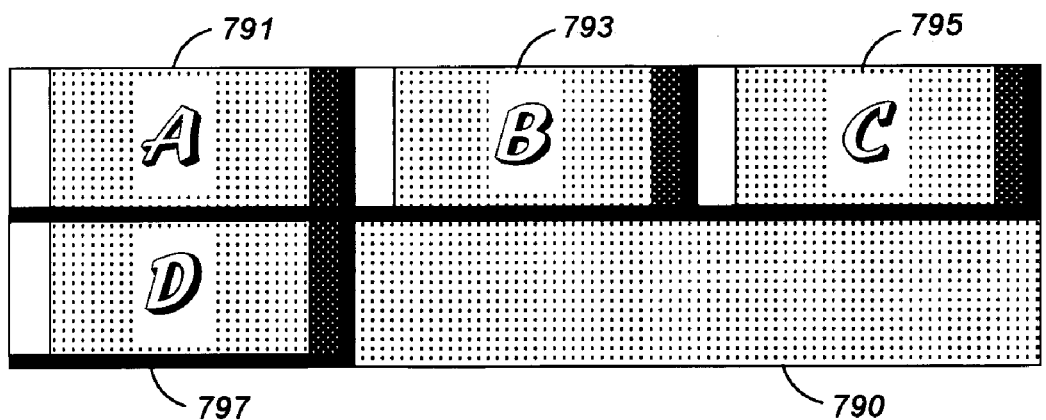
FIG. 21 is a conceptual view for explaining shaping of a content to be embedded in a display area in a preferred embodiment of the present invention.

In FIG. 16, a display-area content creator 563 obtains a display attribute 703 (FIG. 18) (message 5616) and shapes a content in accordance with a display area by using a formatter 577 (messages 5617 to 5631). For example, when the width of a content is larger than that of a display area, the right and left of the content are equally cut. Moreover, as shown in FIG. 21, it is possible to set a plurality of banners 711 to 717 in accordance with a rule that "when the sum of widths of banners currently set is smaller than a display-area width, the set position is decided and when the former is larger than the latter, the banner is set to the next stage" and enlarge or contract the content in accordance with the display area.

Furthermore, the HTML is generated in accordance with the shaped content (messages 5632 and 5633) and transmitted to the web browser 111 of an information terminal 110 through a web server 127 (message 5634).

D. Application to Campaign Using Internet

A mode for changing the information displayed for a predetermined user in accordance with the state of external resources and a mode for communicating e-mails by combining them are described below.

Figure 22:
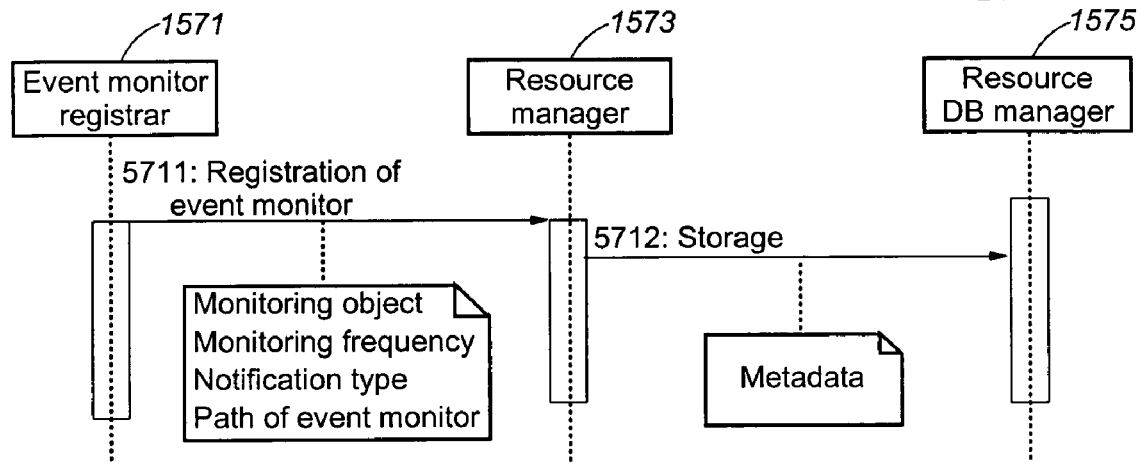
FIG. 22 is a message flow showing an event-monitor registration procedure in a preferred embodiment of the present invention.

D-1. Registration of Event Monitor, Condition-Judging Cell Part, and Event-Purposed Cell Part FIG. 22 is a message flow showing a procedure for registering an event monitor in a preferred embodiment of the present invention. As shown in FIG. 22, a registrar 571 can register an event monitor part in a resource DB 575 in the form of a Java bean by using a resource manager 573 similarly to the case of FIG. 4 (messages 5701 and 5702). An event monitor Java bean in a preferred embodiment of the present invention includes items of monitoring object, monitoring frequency, notification type, and path information to event-purposed cell part.

Moreover, a condition-judging cell part and an event-purposed cell part to be described later are registered through the same procedure as the above. The condition-judging cell part includes event-purposed person's conditions, that is, conditions for categorizing a user such as predetermined age group, predetermined occupation, predetermined income, and predetermined post and their descriptive text among users included in a user control DB as items. The event-purposed cell part is a cell part for registering a purposed person for actually executing an event, which holds information for specifying a condition-judging cell part (part ID), filtering condition, and an e-mail part ID as an item. An e-mail part includes items such as from, to, content, and descriptive text.

D-2. Definition of Campaign

Figure 23:
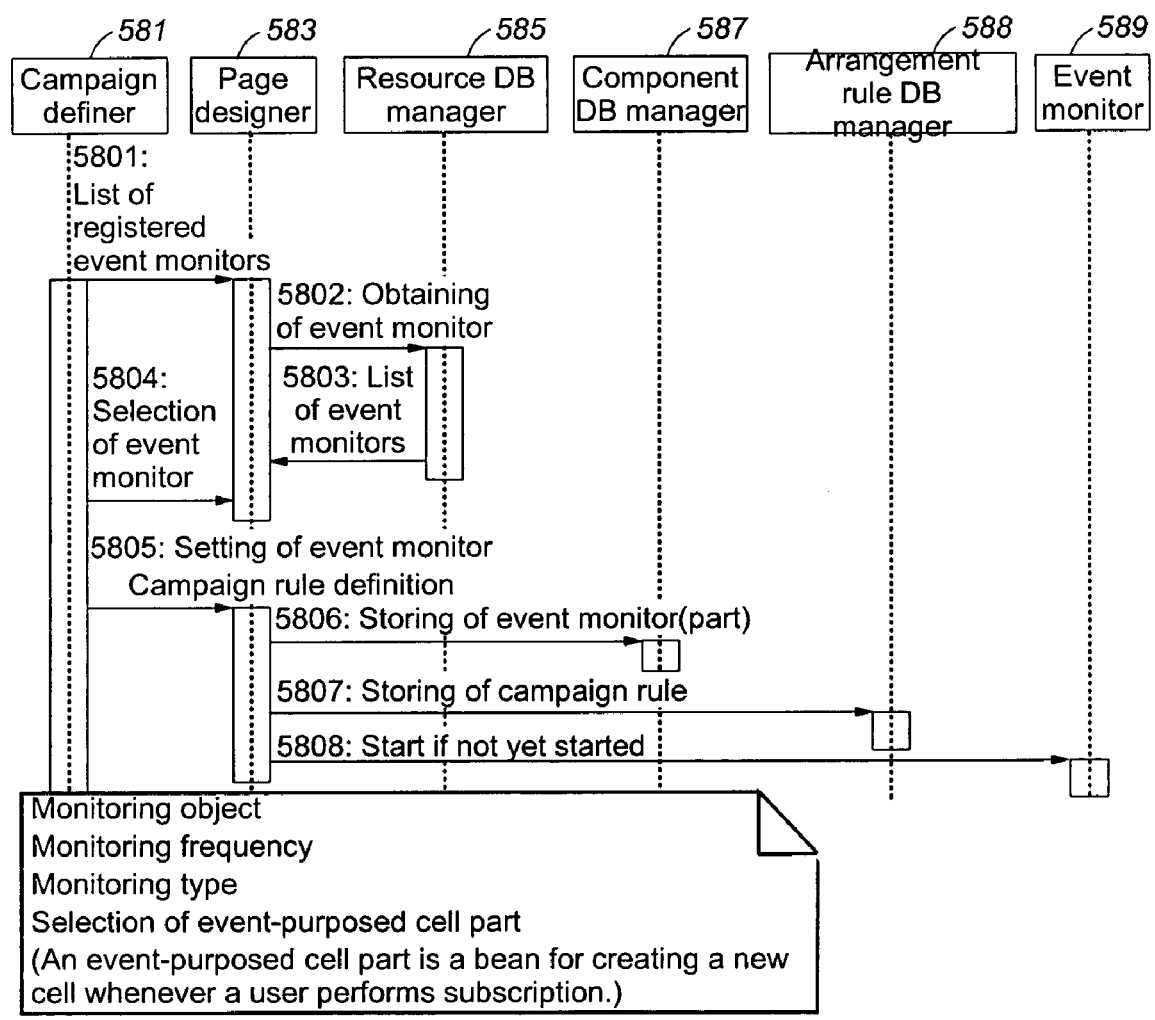
FIG. 23 is a message flow showing a campaign definition procedure in a preferred embodiment of the present invention.

FIG. 23 is a message flow showing a procedure for defining a campaign in a preferred embodiment of the present invention. As shown in FIG. 23, a campaign definer 581 accesses a resource DB 575 through a predetermined screen of a page designer 585 similarly to the case of FIGS. 7 to 11 to obtain a list of registered event monitors (messages 5801 to 5803).

The campaign definer 581 selects registration of new event monitor (message 5804) to register a property through a registration screen (message 5805). For example, a descriptive text capable of intuitively grasping a monitoring object (e.g. the stock of an information company listed on the First Section of Tokyo Stock Exchange) and the information for specifying a place capable of obtaining the information for the descriptive text (URL, information for specifying the type of data for a type of HTML tag) are set as monitoring objects. A default value, an upper limit value, and a lower limit value are set as the monitoring frequency. The presence or absence of an e-mail notification is set to the notification type. The path name, directory name, and file name of published event-purposed cell part are set to the path information to the event-purposed cell part. It is also possible to set a part ID to the path information.

Then, schedule information and information showing presence or absence of publication are input as campaign rules (message 5807). Moreover, in a mode for generating an event in accordance with the state of other resources, it is preferable that the information shown in FIG. 24 is controlled for an arrangement rule DB 720. As shown in FIG. 24, pieces of information for a part type 731, event flag 733, and cell part ID 735 are added to the arrangement rule DB 720. The part type 731 is the information for judging the type of a part such as a banner part, telop part, event-purposed cell part, condition-judging cell part, or event-monitoring part. Moreover, an event flag 733 is a flag for judging whether the subscription to be described later is performed and an event comes into effect. A condition-judging cell part for a user having performed subscription to be described later to use the judgment on whether to meet a predetermined condition is set to the cell part ID 735 when it is an event-monitoring cell part and an event-purposed cell part in which a purposed person actually having an event is registered in the cell part ID 735 in other cases.

Moreover, a page designer 583 designates an arrangement object to an event monitor 589 to instruct to start the event monitor of an event (message 5808). Thereby, the event monitor 589 starts monitoring the event.

D-3. Subscription of Event

Figure 25:
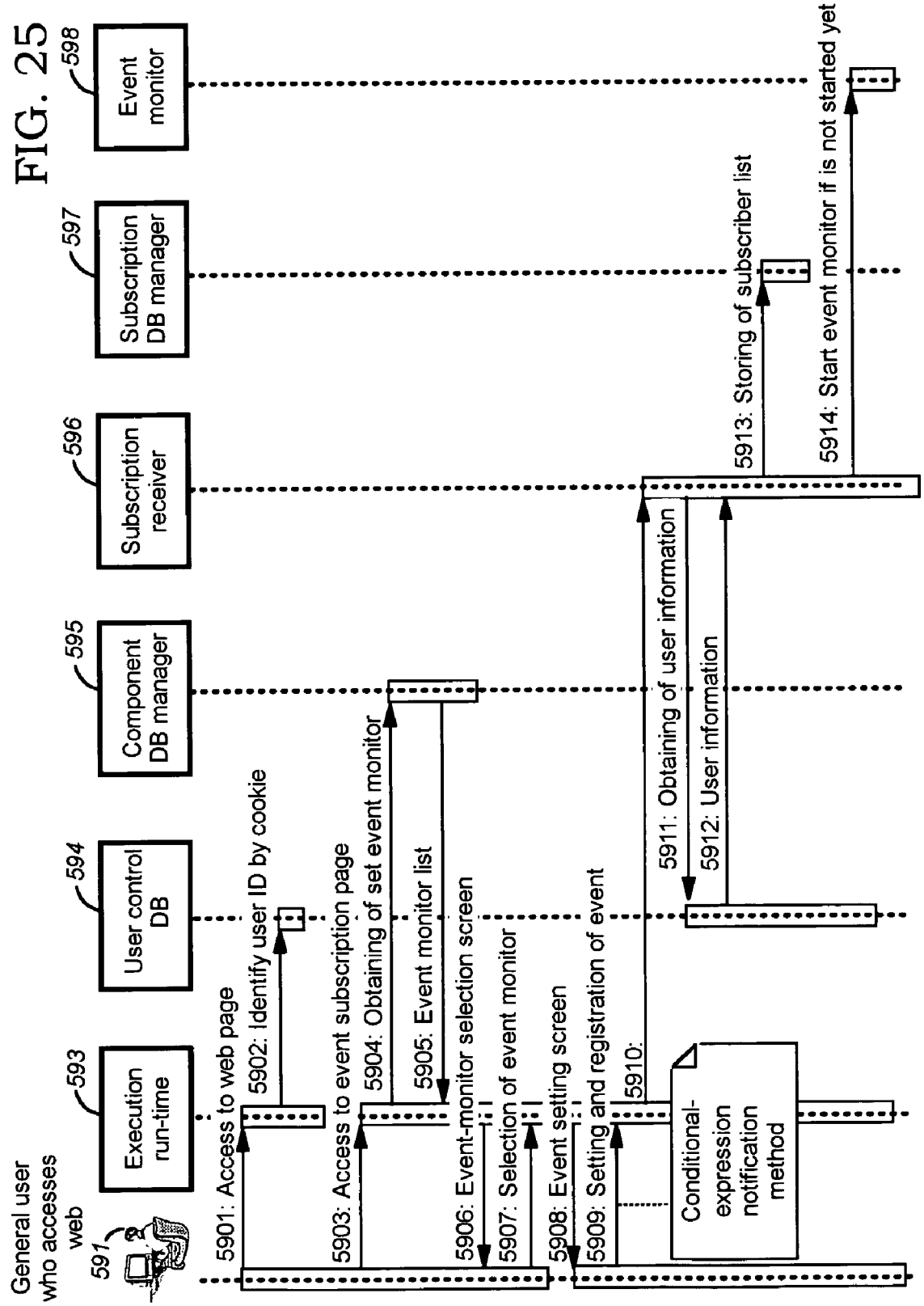
FIG. 25 is a message flow showing a procedure for subscribing an event in a preferred embodiment of the present invention.

FIG. 25 is a message flow showing a procedure for subscribing an event in a preferred embodiment of the present invention. As shown in FIG. 25, a user 591 desiring subscription of an event accesses a web page (message 5901). An execution run-time (component including the display-area content creator 563 and schedule engine 125 in FIG. 2) accesses a user control DB 594 to obtain a user ID by using a Cookie included in an HTTP request as a key (message 5902).

FIG. 26 is a conceptual view showing the information controlled by a user control DB 740 in a preferred embodiment of the present invention. As shown in FIG. 26, the user control DB 740 controls a user ID 741, cookie 743, e-mail address 745, and user-profile information 747. The user-profile information 747 includes pieces of information for a user such as his age, occupation, office, address, and office address. In the case of a preferred embodiment of the present invention, a user registers the above pieces of information by assuming that the user receives a predetermined service through Internet. A user ID is automatically generated depending on a system. The system makes it possible to obtain the information included in a record by using the cookie 743 and a user ID as keys.

When it is recognized that an execution run-time 593 is a user registered as a member, a list of published event-monitoring parts is displayed for the user (messages 5904 to 5906). However, when it is recognized that the execution run-time 593 is not a user registered as a member, it is also possible to output a user registration panel. Moreover, in the case of a preferred embodiment of the present invention, subscription service is provided for members. However, it is also possible to provide subscription service for the general public without conforming to the membership system.

When a user selects "event monitor", a screen for setting an event is displayed (messages 5907 and 5908). Moreover, the user sets parameters of a conditional expression and a notification method (message 5909). For example, when the stock price of company A rises to \120.00 or higher, it is possible to set "desiring notification by e-mail".

Furthermore, the above set information and the information in a user control DB are stored in a subscription DB 597 (messages 5910 to 5913). FIG. 27 is a conceptual view showing control items of the subscription DB 597 (FIG. 25) in a preferred embodiment of the present invention. As shown in FIG. 27, a subscription ID 751, user ID 753, part ID 755, conditional expression 757, notification type 758, and campaign flag 759 are controlled by the subscription DB 750. Moreover, unless an event monitor designated by a user is started, the monitor is started (message 5914).

D-4. Monitoring and Notification of Event

Figure 28A:
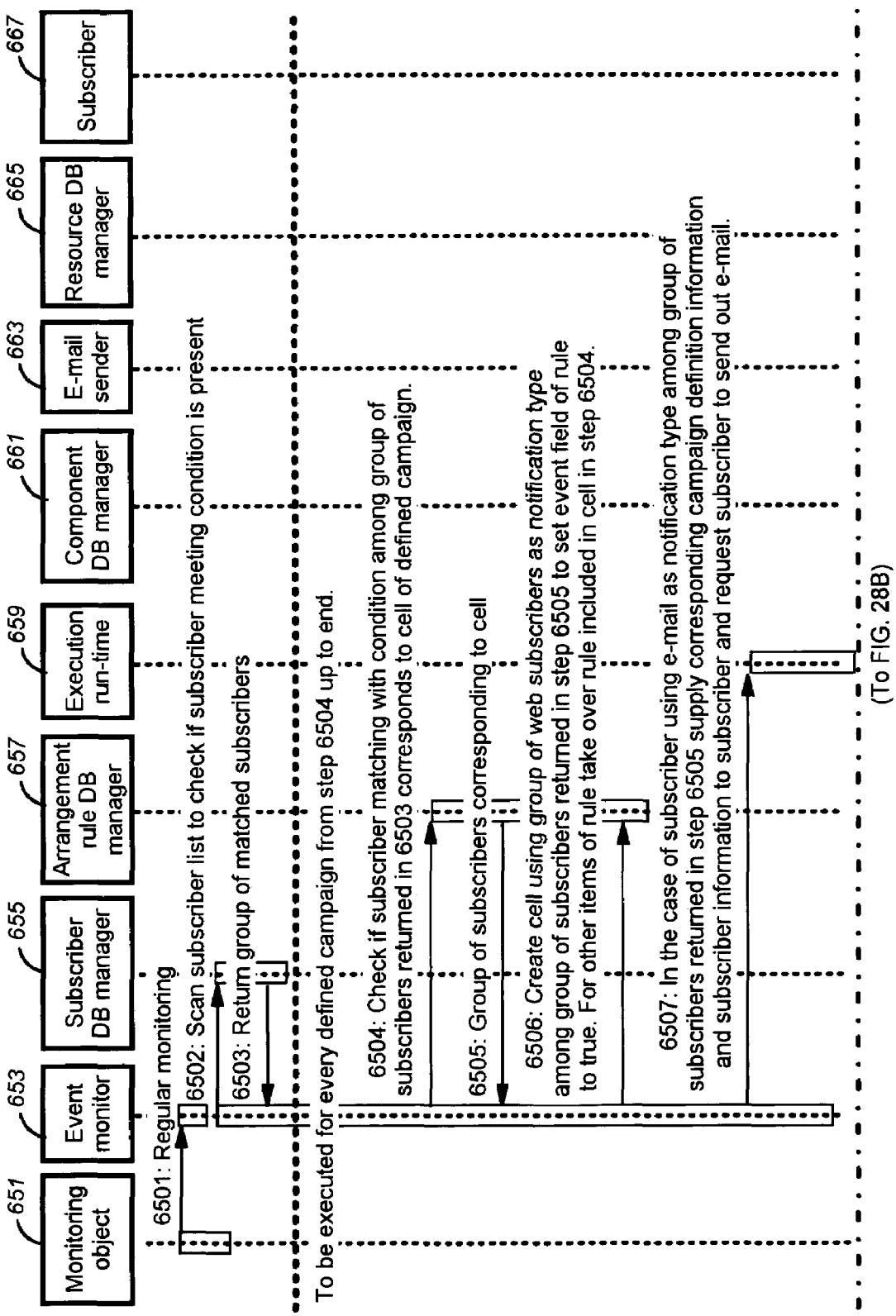
Figure 29:
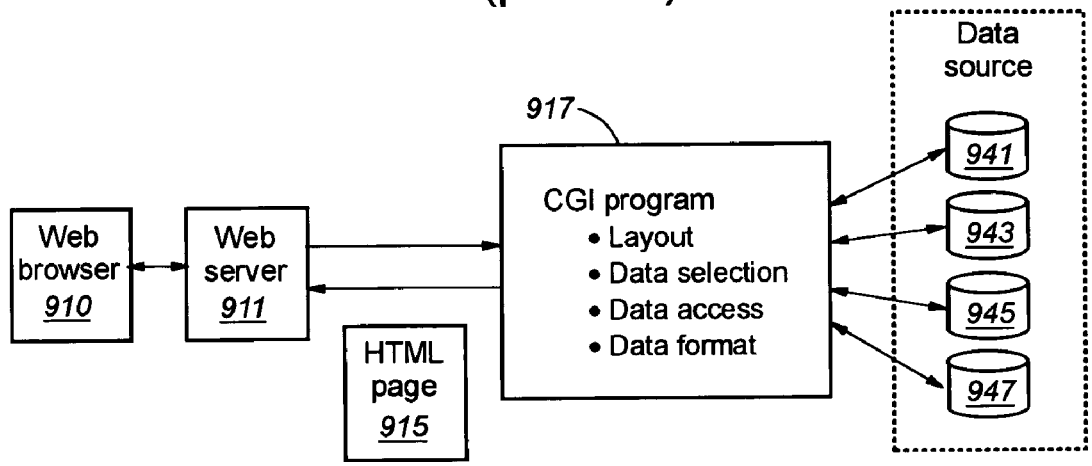
FIG. 29 illustrates a prior art method for embedding a content in a page template.
Figure 30:
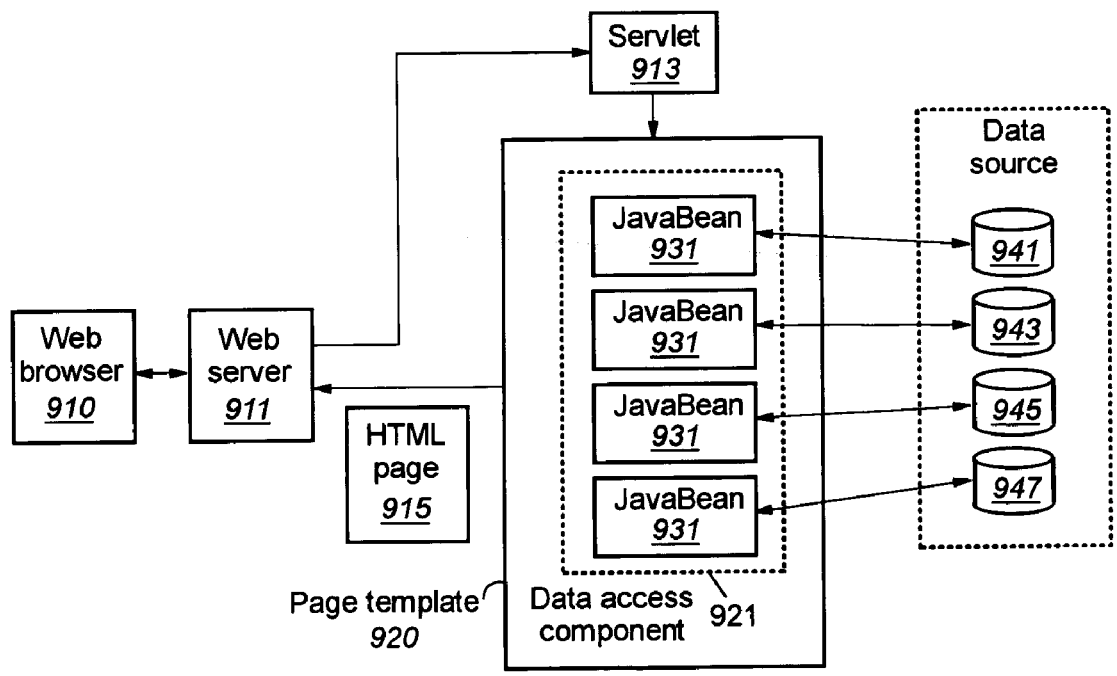
FIG. 30 illustrates a prior art method for embedding a content in a template.

FIGS. 28A and 28B (collectively FIG. 28) are a message flow showing a procedure for monitoring and communicating an event in a preferred embodiment of the present invention. As shown in FIG. 28, a started event monitor 653 monitors a monitoring object 651 including regularly or irregularly fluctuating data at a cycle based on set monitoring-frequency information (message 6501). In the case of a preferred embodiment of the present invention, the event monitor 653 has pieces of information for a monitoring object, event-generating condition, monitoring frequency, subscription ID, and event flag and monitors an object with an event flag on. In the case of a preferred embodiment of the present invention, a monitor part for monitoring an event monitor is used to turn off the event flag 1733 (FIG. 24) of an event monitor completing a schedule and notify an event monitor 653.

Moreover, when the event monitor 653 judges that it is fitted for an event generation condition, it accesses a subscription DB 655 and returns a user ID and part ID corresponding to a subscription ID (messages 6502 and 6503). Moreover, the event monitor 653 accesses an arrangement rule DB 657 by using a part ID as a key to obtain a condition-judging cell part ID 1735 (FIG. 24). Furthermore, the monitor 653 accesses a component DB, fetches the judging condition of a condition-judging cell part from the DB, and compares it with a user profile in a user control DB to judge whether the user is an object for campaign (messages 6504 and 6505).

When the user is judged as an object for campaign, the event monitor 653 fetches an event-purposed cell part corresponding to the condition-judging cell part to register the user ID or cookie of the user in the event-purposed cell part (message 6506). It is also possible to register only a user designating a web to a notification type.

Moreover, when an e-mail is designated to the notification type 758 (FIG. 27) fetched from the subscription DB, the event monitor 653 supplies the ID of the e-mail part and the user ID registered in the event-purposed cell part to the execution run-time 659 (message 6507).

The execution run-time 659 accesses the e-mail part to obtain an e-mail sender (From) (messages 6508 to 6511) and requests the e-mail sender 663 to send out an e-mail together with a user ID (message 6512).

The e-mail sender 663 accesses a user control DB 665 to obtain an e-mail address from the user ID and generates an e-mail in accordance with "from" held by an e-mail part as a property and content information to send out the e-mail (message 6515).

Figure 17:
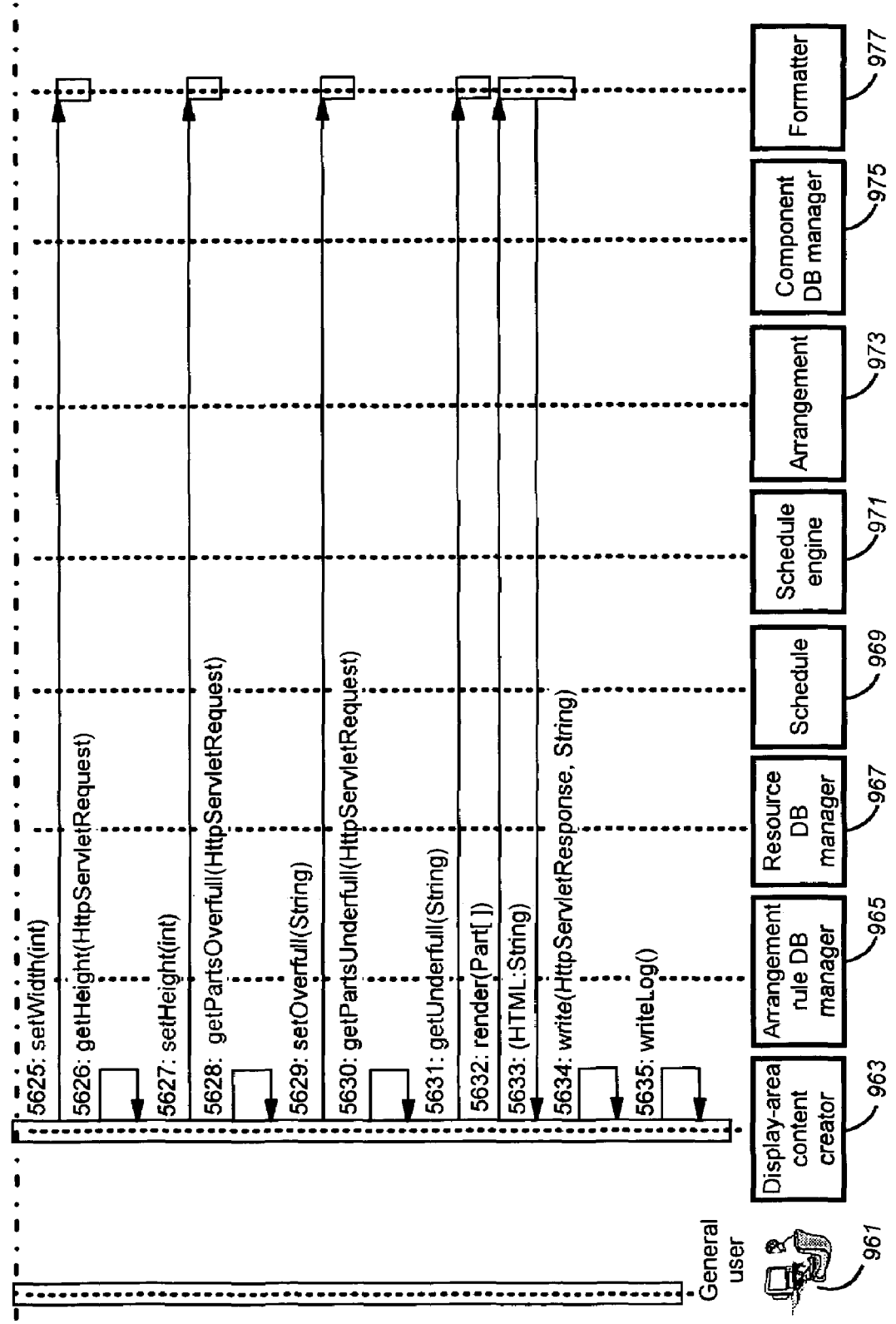
FIG. 17 is a message flow showing a procedure for generating a content to be embedded in a display area in a preferred embodiment of the present invention.

Moreover, when an HTTP request for requesting a predetermined page template is transmitted from a user, the processing described for FIGS. 16 and 17 is executed. Then, the event flag 1733 and cell part ID 1735 are also judged by the arrangement object used for the above processing together with schedules 1727 and 1728 and a publication flag 1729 as display conditions as shown in FIG. 24. In this case, a cell part in which the user is registered in the message 6506 of FIG. 28 is designated for the cell part ID 1735 and an event flag is also turned on. Therefore, the HTML for displaying a predetermined part (banner) or the like in a display area is gotten.

As described above, the present invention makes it possible to change contents or layouts to be embedded in a page template without forcing a display-information manager to edit an HTML file or correct a server program such as a CGI. Moreover, it is possible to dynamically change contents or layouts to be embedded in a page template in accordance with the state when an access is executed by a user. Furthermore, it is possible to provide information fit to the taste of each user, only for the user, or a group including the user and improve the advertisement effect.

Although the present invention has been described with respect to a specific preferred embodiment thereof, various changes and modifications may be suggested to one skilled in the art and it is intended that the present invention encompass such changes and modifications as fall within the scope of the appended claims.

What is claimed:

1. A display-information deciding method, executed by a display-information deciding apparatus, for transmitting display-information to an information terminal having a display screen and an input unit, comprising the steps of:
   (a) analyzing a page template specified by a display-information obtaining request sent from the information terminal;
   (b) obtaining display-area specifying information from said page template;

(c) obtaining a plurality of banner beans related to said display-area specifying information in the display-information deciding apparatus;
(d) inspecting a plurality of schedule conditions respectively related to each of said banner beans to determine whether each schedule condition is a bean including a banner to be embedded in said page template;
(e) obtaining display-image specifying information and link-destination-URL specifying information from a banner bean judged as a bean including a banner to be embedded in the page template; and
(f) transmitting display image data corresponding to said display-image specifying information and character string information corresponding to said link-destination-URL specifying information to the information terminal.

2. A display-information deciding method, executed by a display-information deciding apparatus, for transmitting display information to an information terminal having a display screen and an input unit, comprising the steps of:
(a) defining a page-template bean for holding as a property information for specifying an HTML file, including a Servlet defining section containing display-area specifying information as a parameter;
(b) obtaining content specifying information from a part bean determined to be a part bean for holding content specifying information for specifying content of a part displayed in a display area as a property;
(c) setting schedule information serving as a condition for contents to be displayed in said display area to said part bean; and
(d) holding said part bean and display-area specifying information by relating said part bean and said display-area specifying information with each other.

3. A display-information deciding system including a data base to be accessed by a display-information deciding apparatus for transmitting corresponding display information in response to a request for obtaining an HTML file including a Servlet defining section containing display-area specifying information as a parameter from an information terminal having a display screen and an input unit, comprising:
(a) a component DB for storing a part bean holding content specifying information for specifying the content of a part displayed in a display area as a property; and
(b) an arrangement rule DB for storing an arrangement object for holding said part bean, the display-area specifying information, and schedule information serving as a condition for said part bean to be displayed in said display area by relating said part bean, the display-area specifying information, and said schedule information with each other.

4. A computer-readable storage medium for storing a display-information deciding program, executed by a display-information deciding apparatus, for transmitting display information to an information terminal having a display screen and an input unit, wherein the program includes: (a) program code for instructing the display-information deciding apparatus to analyze a page template specified by a display information obtaining request sent from the information terminal; (b) program code for instructing the display-information deciding apparatus to obtain display-area specifying information from said page template; (c) program code for instructing the display-information deciding apparatus to obtain a plurality of banner beans related to said display-area specifying information in the display-information deciding apparatus; (d) program code for instructing the display-information deciding apparatus to inspect a plurality of schedule conditions respectively related to each a of said plurality of banner beans and determine whether each schedule condition is a bean including a banner to be embedded in said page template; (e) program code for instructing the display-information deciding apparatus to obtain display-image specifying information and link-destination-URL specifying information from a banner bean judged as a bean including a banner to be embedded in said page template; and (f) program code for instructing the display-information deciding apparatus to transmit display image data corresponding to the display-image specifying information and character string information corresponding to said link-destination-URL specifying information to the information terminal.

5. A computer-readable storage medium for storing an object to be accessed by a display-information deciding apparatus for transmitting the corresponding display information in response to a request for obtaining an HTML file including a Servlet defining section containing a display-area specifying information and display attribute information as parameters sent from an information terminal having a display screen and an input unit, comprising: (a) a banner bean holding banner-display-image specifying information for specifying a display image of a banner displayed in a display area and banner-link-destination-URL specifying information for specifying a link destination URL of said banner as properties; and (b) an arrangement object for holding said banner bean, the display-area specifying information, and schedule information serving as a condition for said banner to be displayed in a display area by relating said banner bean, the display-area specifying information, and said schedule information with each other.

* * * * *